US011496433B2

(12) United States Patent
Sheppard et al.

(10) Patent No.: US 11,496,433 B2
(45) Date of Patent: Nov. 8, 2022

(54) METHODS AND APPARATUS TO ESTIMATE DEMOGRAPHICS OF USERS EMPLOYING SOCIAL MEDIA

(71) Applicant: The Nielsen Company (US), LLC, New York, NY (US)

(72) Inventors: Michael Richard Sheppard, Brooklyn, NY (US); Matthew B. Reid, Alameda, CA (US); Alejandro Terrazas, Santa Cruz, CA (US); Peter Otto Robert Lipa, Tucson, AZ (US); Brian George Schiller, St. Louis, MO (US)

(73) Assignee: THE NIELSEN COMPANY (US), LLC, New York, NY (US)

( * ) Notice: Subject to any disclaimer, the term of this patent is extended or adjusted under 35 U.S.C. 154(b) by 139 days.

(21) Appl. No.: 16/450,440

(22) Filed: Jun. 24, 2019

(65) Prior Publication Data

US 2019/0379629 A1    Dec. 12, 2019

Related U.S. Application Data

(63) Continuation of application No. 14/142,411, filed on Dec. 27, 2013, now Pat. No. 10,333,882.
(Continued)

(51) Int. Cl.
*G06Q 30/02* (2012.01)
*G06Q 30/00* (2012.01)
*H04L 51/52* (2022.01)

(52) U.S. Cl.
CPC ............ *H04L 51/52* (2022.05); *G06Q 30/00* (2013.01); *G06Q 30/02* (2013.01)

(58) Field of Classification Search
None
See application file for complete search history.

(56) References Cited

U.S. PATENT DOCUMENTS 5,373,315 A    12/1994 Dufresne et al.
5,584,050 A    12/1996 Lyons
(Continued)

FOREIGN PATENT DOCUMENTS

AU    2013205736    5/2013
AU    2013204865    1/2014
(Continued)

OTHER PUBLICATIONS

Korean Intellectual Property Office, "Notice of Preliminary Rejection," issued in connection with Korean Application No. 10-2015-7010954, dated Jan. 25, 2016 (9 pages).
(Continued)

*Primary Examiner* — Jamie H Austin
(74) *Attorney, Agent, or Firm* — Hanley, Flight & Zimmerman, LLC

(57) ABSTRACT

Methods, apparatus, systems and articles of manufacture are disclosed to estimate demographics of users employing social media. An example method disclosed herein includes (1) identifying a social media message regarding an asset, the social media message associated with a user identifier associated with the user, (2) determining demographics associated with a group of people exposed to the asset, (3) associating the user identifier with the asset, and (4) repeating (1) to (3). The example method also includes (5) combining demographics associated with two or more different groups of people with which the user identifier is associated to estimate a demographic profile for the user.

20 Claims, 10 Drawing Sheets

Related U.S. Application Data

(60) Provisional application No. 61/871,243, filed on Aug. 28, 2013.

(56) References Cited

U.S. PATENT DOCUMENTS

| | | | |
|---|---|---|---|
| 5,594,934 | A | 1/1997 | Lu et al. |
| 5,675,510 | A | 10/1997 | Coffey et al. |
| 5,796,952 | A | 8/1998 | Davis et al. |
| 5,848,396 | A | 12/1998 | Gerace |
| 5,948,061 | A | 9/1999 | Merriman et al. |
| 6,035,339 | A | 3/2000 | Agraharam et al. |
| 6,052,370 | A | 4/2000 | Ogura |
| 6,055,573 | A | 4/2000 | Gardenswartz et al. |
| 6,098,093 | A | 8/2000 | Bayeh et al. |
| 6,102,406 | A | 8/2000 | Miles et al. |
| 6,108,637 | A | 8/2000 | Blumenau |
| 6,138,155 | A | 10/2000 | Davis et al. |
| 6,223,215 | B1 | 4/2001 | Hunt et al. |
| 6,415,323 | B1 | 7/2002 | Mccanne et al. |
| 6,434,614 | B1 | 8/2002 | Blumenau |
| 6,460,079 | B1 | 10/2002 | Blumenau |
| 6,529,952 | B1 | 3/2003 | Blumenau |
| 6,658,410 | B1 | 12/2003 | Sakamaki et al. |
| 6,839,680 | B1 | 1/2005 | Liu et al. |
| 6,877,007 | B1 | 4/2005 | Hentzel et al. |
| 6,993,590 | B1 | 1/2006 | Gauthter et al. |
| 7,039,699 | B1 | 5/2006 | Narin et al. |
| 7,092,926 | B2 | 8/2006 | Cerrato |
| 7,159,023 | B2 | 1/2007 | Tufts |
| 7,181,412 | B1 | 2/2007 | Fulgoni et al. |
| 7,260,837 | B2 | 8/2007 | Abraham et al. |
| 7,266,687 | B2 | 9/2007 | Sowa et al. |
| 7,343,417 | B2 | 3/2008 | Baum |
| 7,386,473 | B2 | 6/2008 | Blumenau |
| 7,406,516 | B2 | 7/2008 | Davis et al. |
| 7,546,370 | B1 | 6/2009 | Acharya et al. |
| 7,590,568 | B2 | 9/2009 | Blumenau |
| 7,613,635 | B2 | 11/2009 | Blumenau |
| 7,644,156 | B2 | 1/2010 | Blumenau |
| 7,650,407 | B2 | 1/2010 | Blumenau |
| 7,653,724 | B2 | 1/2010 | Blumenau |
| 7,698,422 | B2 | 4/2010 | Vanderhook et al. |
| 7,716,326 | B2 | 5/2010 | Blumenau |
| 7,720,963 | B2 | 5/2010 | Blumenau |
| 7,720,964 | B2 | 5/2010 | Blumenau |
| 7,756,974 | B2 | 7/2010 | Blumenau |
| 7,788,216 | B2 | 8/2010 | Li et al. |
| 7,882,242 | B2 | 2/2011 | Chen |
| 7,933,843 | B1 | 4/2011 | Von Groll et al. |
| 7,941,525 | B1 | 5/2011 | Yavilevich |
| 7,949,565 | B1 | 5/2011 | Eldering et al. |
| 7,958,234 | B2 | 6/2011 | Thomas et al. |
| 7,962,603 | B1 | 6/2011 | Morimoto |
| 8,046,255 | B2 | 10/2011 | Bistriceanu et al. |
| 8,060,601 | B1 | 11/2011 | Brown et al. |
| 8,108,245 | B1 | 1/2012 | Hosea et al. |
| 8,131,861 | B2 | 3/2012 | Butler et al. |
| 8,229,780 | B2 | 7/2012 | Davidow et al. |
| 8,266,687 | B2 | 9/2012 | Baldry |
| 8,271,886 | B2 | 9/2012 | Lee et al. |
| 8,302,120 | B2 | 10/2012 | Ramaswamy |
| 8,307,006 | B2 | 11/2012 | Hannan et al. |
| 8,370,489 | B2 | 2/2013 | Mazumdar et al. |
| 8,462,160 | B2 | 6/2013 | Lindsay et al. |
| 8,631,122 | B2 | 1/2014 | Kadam et al. |
| 8,700,457 | B2 | 4/2014 | Craft |
| 8,713,168 | B2 | 4/2014 | Heffernan et al. |
| 8,910,195 | B1 | 12/2014 | Barney et al. |
| 8,935,713 | B1 | 1/2015 | Gabel et al. |
| 10,333,882 | B2 | 6/2019 | Sheppard et al. |
| 2001/0049620 | A1 | 12/2001 | Blasko |
| 2002/0099609 | A1 | 7/2002 | Nascenzi et al. |
| 2002/0111172 | A1 | 8/2002 | DeWolf et al. |
| 2003/0006911 | A1 | 1/2003 | Smith et al. |
| 2003/0037131 | A1 | 2/2003 | Verma |
| 2003/0046385 | A1 | 3/2003 | Vincent |
| 2003/0177488 | A1 | 9/2003 | Smith et al. |
| 2003/0220901 | A1 | 11/2003 | Carr et al. |
| 2004/0088212 | A1 | 5/2004 | Hill |
| 2005/0131762 | A1 | 6/2005 | Bharat et al. |
| 2005/0166233 | A1 | 7/2005 | Beyda et al. |
| 2005/0223093 | A1 | 10/2005 | Hanson et al. |
| 2006/0168613 | A1 | 7/2006 | Wood et al. |
| 2006/0178996 | A1 | 8/2006 | Matsushima et al. |
| 2006/0271641 | A1 | 11/2006 | Stavrakos et al. |
| 2007/0011039 | A1 | 1/2007 | Oddo |
| 2007/0043769 | A1 | 2/2007 | Kasahara et al. |
| 2007/0106787 | A1 | 5/2007 | Blumenau |
| 2007/0106792 | A1 | 5/2007 | Blumenau |
| 2007/0156532 | A1 | 7/2007 | Nyhan et al. |
| 2008/0004958 | A1 | 1/2008 | Ralph et al. |
| 2008/0086356 | A1 | 4/2008 | Glassman et al. |
| 2008/0104225 | A1 | 5/2008 | Zhang et al. |
| 2008/0109306 | A1* | 5/2008 | Maigret ............ G06Q 30/0277 705/14.46 |
| 2008/0126420 | A1 | 5/2008 | Wright et al. |
| 2008/0147487 | A1 | 6/2008 | Hirshberg |
| 2008/0155588 | A1* | 6/2008 | Roberts ............ H04N 21/25808 725/34 |
| 2008/0201427 | A1 | 8/2008 | Chen |
| 2008/0201472 | A1 | 8/2008 | Bistriceanu et al. |
| 2008/0215607 | A1 | 9/2008 | Kaushansky et al. |
| 2008/0235243 | A1 | 9/2008 | Lee et al. |
| 2008/0248815 | A1 | 10/2008 | Busch |
| 2008/0276179 | A1 | 11/2008 | Borenstein et al. |
| 2009/0024546 | A1 | 1/2009 | Ficcaglia et al. |
| 2009/0030780 | A1 | 1/2009 | York et al. |
| 2009/0070443 | A1 | 3/2009 | Vanderhook et al. |
| 2009/0076899 | A1 | 3/2009 | Gbodimowo |
| 2009/0132349 | A1 | 5/2009 | Berkley et al. |
| 2009/0217315 | A1 | 8/2009 | Malik et al. |
| 2009/0271256 | A1 | 10/2009 | Toebes et al. |
| 2009/0292526 | A1 | 11/2009 | Harari et al. |
| 2009/0292587 | A1 | 11/2009 | Fitzgerald |
| 2009/0327026 | A1 | 12/2009 | Bistriceanu et al. |
| 2010/0030648 | A1* | 2/2010 | Manolescu ............ G06Q 30/02 705/14.66 |
| 2010/0070621 | A1 | 3/2010 | Urdan et al. |
| 2010/0088152 | A1 | 4/2010 | Bennett |
| 2010/0121676 | A1 | 5/2010 | Jackson |
| 2010/0153175 | A1 | 6/2010 | Pearson et al. |
| 2010/0153544 | A1 | 6/2010 | Krassner et al. |
| 2010/0205057 | A1 | 8/2010 | Hook et al. |
| 2010/0241745 | A1 | 9/2010 | Offen et al. |
| 2010/0262498 | A1 | 10/2010 | Nolet et al. |
| 2010/0268540 | A1 | 10/2010 | Arshi et al. |
| 2010/0268573 | A1 | 10/2010 | Jain et al. |
| 2010/0299604 | A1 | 11/2010 | Blumenau |
| 2010/0325051 | A1 | 12/2010 | Etchegoyen |
| 2011/0016482 | A1 | 1/2011 | Tidwell et al. |
| 2011/0029636 | A1 | 2/2011 | Smyth et al. |
| 2011/0041062 | A1 | 2/2011 | Singer et al. |
| 2011/0055196 | A1 | 3/2011 | Sundelin et al. |
| 2011/0087519 | A1 | 4/2011 | Fordyce, III et al. |
| 2011/0093327 | A1 | 4/2011 | Fordyce, III et al. |
| 2011/0106620 | A1 | 5/2011 | Setiawan et al. |
| 2011/0137733 | A1 | 6/2011 | Baird et al. |
| 2011/0191184 | A1 | 8/2011 | Blackhurst et al. |
| 2011/0191664 | A1 | 8/2011 | Sheledheda et al. |
| 2011/0191831 | A1 | 8/2011 | Chan et al. |
| 2011/0202500 | A1 | 8/2011 | Warn et al. |
| 2011/0208860 | A1 | 8/2011 | Sim et al. |
| 2011/0231240 | A1 | 9/2011 | Schoen et al. |
| 2011/0246306 | A1 | 10/2011 | Blackhurst et al. |
| 2011/0246641 | A1 | 10/2011 | Pugh et al. |
| 2011/0246927 | A1 | 10/2011 | Im |
| 2011/0264663 | A1 | 10/2011 | Verkasalo |
| 2011/0288907 | A1 | 11/2011 | Harvey et al. |
| 2012/0005213 | A1 | 1/2012 | Hannan et al. |
| 2012/0005221 | A1 | 1/2012 | Ickman et al. |
| 2012/0023131 | A1* | 1/2012 | Downey ............ H04N 21/812 707/769 |
| 2012/0030037 | A1 | 2/2012 | Carriero |
| 2012/0042005 | A1 | 2/2012 | Papakostas et al. |

(56) References Cited

U.S. PATENT DOCUMENTS

| | | |
|---|---|---|
| 2012/0047219 A1 | 2/2012 | Feng et al. |
| 2012/0072469 A1 | 3/2012 | Perez et al. |
| 2012/0109709 A1 | 5/2012 | Fordyce, III et al. |
| 2012/0109882 A1 | 5/2012 | Bouse et al. |
| 2012/0110027 A1 | 5/2012 | Falcon |
| 2012/0110071 A1 | 5/2012 | Zhou et al. |
| 2012/0123854 A1 | 5/2012 | Anderson et al. |
| 2012/0130802 A1 | 5/2012 | Shimizu |
| 2012/0136723 A1 | 5/2012 | Larner et al. |
| 2012/0136959 A1 | 5/2012 | Kadam et al. |
| 2012/0143713 A1 | 6/2012 | Dittus et al. |
| 2012/0150958 A1 | 6/2012 | Besehanic et al. |
| 2012/0151322 A1 | 6/2012 | Lindsay et al. |
| 2012/0158954 A1 | 6/2012 | Heffernan et al. |
| 2012/0166520 A1 | 6/2012 | Lindsay et al. |
| 2012/0173701 A1 | 7/2012 | Tenbrock |
| 2012/0192214 A1 | 7/2012 | Hunn et al. |
| 2012/0209795 A1* | 8/2012 | Glickman ........... G06Q 30/0242 706/12 |
| 2012/0209918 A1* | 8/2012 | Shah ................. G06Q 30/0251 709/205 |
| 2012/0209920 A1 | 8/2012 | Neystadt et al. |
| 2012/0215621 A1 | 8/2012 | Heffernan et al. |
| 2012/0239407 A1 | 9/2012 | Lynch et al. |
| 2012/0239809 A1 | 9/2012 | Mazumdar et al. |
| 2012/0302222 A1 | 11/2012 | Williamson et al. |
| 2012/0310729 A1 | 12/2012 | Dalto et al. |
| 2012/0311017 A1 | 12/2012 | Sze et al. |
| 2012/0323675 A1 | 12/2012 | Paparo |
| 2012/0331561 A1* | 12/2012 | Broadstone ............. G06F 21/31 726/26 |
| 2013/0060629 A1 | 3/2013 | Rangsikitpho et al. |
| 2013/0073473 A1* | 3/2013 | Heath ................ G06Q 30/0241 705/319 |
| 2013/0080263 A1 | 3/2013 | Goldman et al. |
| 2013/0080556 A1 | 3/2013 | Gross |
| 2013/0097311 A1 | 4/2013 | Mazumdar et al. |
| 2013/0097312 A1 | 4/2013 | Mazumdar et al. |
| 2013/0103637 A1 | 4/2013 | Dror et al. |
| 2013/0122934 A1* | 5/2013 | Branch .............. G06Q 30/0241 455/456.3 |
| 2013/0124478 A1 | 5/2013 | Ginzburg et al. |
| 2013/0138506 A1 | 5/2013 | Zhu et al. |
| 2013/0145022 A1 | 6/2013 | Srivastava et al. |
| 2013/0151311 A1 | 6/2013 | Smallwood et al. |
| 2013/0159499 A1 | 6/2013 | Besehanic |
| 2013/0204711 A1 | 8/2013 | Worthen et al. |
| 2013/0212188 A1 | 8/2013 | Duterque et al. |
| 2013/0227601 A1 | 8/2013 | Zigmond et al. |
| 2013/0246609 A1 | 9/2013 | Topchy et al. |
| 2013/0273941 A1 | 10/2013 | Grokop |
| 2013/0282817 A1 | 10/2013 | Montgomery et al. |
| 2013/0282898 A1 | 10/2013 | Kalus et al. |
| 2013/0332604 A1 | 12/2013 | Seth et al. |
| 2013/0346154 A1 | 12/2013 | Holz et al. |
| 2014/0149422 A1* | 5/2014 | Sadler .................... G06Q 50/01 707/741 |
| 2014/0156761 A1 | 6/2014 | Heffernan et al. |
| 2014/0173642 A1 | 6/2014 | Vinson et al. |
| 2014/0214978 A1 | 7/2014 | Splaine et al. |
| 2015/0067075 A1 | 3/2015 | Sheppard et al. |
| 2015/0206183 A1 | 7/2015 | Zhou et al. |
| 2016/0189181 A1 | 6/2016 | McClave et al. |

FOREIGN PATENT DOCUMENTS

| | | |
|---|---|---|
| CN | 101222348 | 7/2008 |
| CN | 101505247 | 8/2009 |
| CN | 102272786 | 12/2011 |
| CN | 102971730 | 3/2013 |
| GB | 2176639 | 12/1986 |
| JP | 07262167 | 10/1995 |
| JP | 2001282982 | 10/2001 |
| JP | 2001357192 | 12/2001 |
| JP | 2002163562 | 6/2002 |
| JP | 2002373152 | 12/2002 |
| JP | 2003529127 | 9/2003 |
| JP | 2004504674 | 2/2004 |
| JP | 2006127320 | 5/2006 |
| JP | 2006127321 | 5/2006 |
| JP | 2010257448 | 11/2010 |
| JP | 2012108916 | 6/2012 |
| KR | 20020037980 | 5/2002 |
| KR | 20090020558 | 2/2009 |
| KR | 20100051325 | 5/2010 |
| KR | 20100094021 | 8/2010 |
| KR | 20110017895 | 2/2011 |
| KR | 20110023293 | 3/2011 |
| KR | 20120091411 | 8/2012 |
| KR | 20120123148 | 11/2012 |
| WO | 9617467 | 6/1996 |
| WO | 9628904 | 9/1996 |
| WO | 9641495 | 12/1996 |
| WO | 0207054 | 1/2002 |
| WO | 03027860 | 4/2003 |
| WO | 2005024689 | 3/2005 |
| WO | 20100083278 | 7/2010 |
| WO | 2010088372 | 8/2010 |
| WO | 2011097624 | 8/2011 |
| WO | 2012019643 | 2/2012 |
| WO | 2012040371 | 3/2012 |
| WO | 2012087954 | 6/2012 |
| WO | 2012128895 | 9/2012 |
| WO | 2012170902 | 12/2012 |
| WO | 2012177866 | 12/2012 |
| WO | 2013122907 | 8/2013 |
| WO | 2015031262 | 3/2015 |

OTHER PUBLICATIONS

"Plug-ins: DRTV," Direct Marketing News, <http://www.dmnews.com/plug-ins-drtv/article/229234/>, Mar. 1, 2012, retrieved Jun. 1, 2012 (3 pages).

Creegan, Matthew, "Can Twitter Data Explain Sharknado TV Appeal?," CNBC.com, Aug. 15, 2013, retrieved on Aug. 19, 2013, retrieved from <http://www.cnbc.com/id/100956943> (4 pages).

"Nielsen and NetRatings Launch National TV/Internet Fusion Database," PR Newswire, <http://www.prnewswire.com/news-releases/nielsen-and-netrati- ngs-launch-national-tvinternet-fusion-database-55825557.html>, Nov. 1, 2006, retrieved on Aug. 19, 2013 (2 pages).

Fink et al, "Social- and Interactive-Television Applications Based on Real-Time Ambient-Audio Identification," European Conference on Interactive Television (EuroITV), 2006 (10 pages).

Hibberd, James, "Study Proves Twitter Drives TV Ratings for First Time," Inside TV, <http://insidetv.ew.com/2013/08/06/twitter-drives-tv-ratings/>, Aug. 6, 2013, retrieved on Aug. 28, 2013 (2 pages).

Fader et al., "The Triggers for TV Viewing Promos, Social Media, and Word-of-Mouth," The Academic Team Report, Jul. 2013 (25 pages).

Boorstin, Julia, "TV Goes Social, Nielsen and Twitter Partner Up on New Rating," CNBC.com, <http://www.cnbc.com/id/100321515/print>, Dec. 17, 2012, retrieved on Feb. 26, 2014 (2 pages).

"TV/Internet Convergence Measurement," The Nielsen Company, 2008 (4 pages).

International Searching Authority, "International Search Report and the Written Opinion of the International Searching Authority," issued in connection with Application No. PCT/US2013/045211 dated Feb. 25, 2014 (13 pages).

"Nielsen to Offer Integrated, All-Electronic Television Measurement Across Multiple Media Platforms," PR Newswire, <http://www.prnewswire.com/news-releases/nielsen-to-offer-integrated-a-11-electronic-television-measurement-across-multiple-media-platforms-70733- 022.html>, Jun. 14, 2006, retrieved Jun. 1, 2012 (5 pages).

U.S. Appl. No. 14/584,436, "Methods and Apparatus to Estimate Demographics of an Audience of a Media Event Using Social Media Message Sentiment," filed Dec. 29, 2014, 86 pages.

Stelter, "Nielsen to Measure Twitter Chatter About TV Shows," The New York Times, Oct. 6, 2013, 3 pages, retrieved from <http://www.nytimes.com/2013/10/07/business/media/nielsen-to-measure-t- witter-chatter-about-tv.html>.

(56) References Cited

OTHER PUBLICATIONS

"The Follow-Back: Understanding the Two-Way Causal Influence Between Twitter Activity and TV Viewership," The Nielsen Company (US), LLC, Aug. 6, 2013, 5 pages, retrieved from <http://www.nielsen.com/us/en/insights/news/2013/the-follow-back-understanding-the-two-way-causal-influence-betw.html>.

United States Patent and Trademark Office, "Non-Final Office Action," issued in connection with U.S. Appl. No. 13/915,381, dated Jan. 30, 2015 (7 pages).

Arbitron Inc and Edison Research, "The Infinite Dial 2011: Navigating Digital Platforms," 2011 (83 pages).

Adam et al., "Privacy Preserving Integration of Health Care Data," American Medical Informatics Association, AMIA Annual Symposium Proceedings (6 pages).

Albanesius, Chloe, "Facebook Issues Fix for Several Tracking Cookies," PC Mag, Sep. 28, 2011, retrieved from <http://pcmag.com/article2/0,2817,2393750,00.asp> (2 pages).

Braverman, Samantha, "Are the Online Marketing Efforts of TV Shows and Programs Worthwhile?" PR Newswire Association, Mar. 30, 2011 (10 pages).

Coffey, Steve, "Internet Audience Measurement: A Practitioner's View," Journal of Interactive Advertising, vol. 1, No. 2, Spring 2001, pp. 10-17 (8 pages).

Cubrilovic, Nik, "Logging Out of Facebook is Not Enough," New Web Order, retrieved from <http://nikcub.appspot.com>, Sep. 25, 2011 (3 pages).

Danaher, Peter J., "A Canonical Expansion Model for Multivariate Media Exposure Distributions: A Generalization of the 'Duplication of Viewing Law'," Journal of Marketing Research, vol. 28, Aug. 1991, pp. 361-367 (7 pages).

Edwards, Jim, "Apple Wants More Advertisers to Use Its iPhone Tracking System," Business Insider, Jun. 13, 2013, retrieved from <http://www.businessinsider.com/aples-idfa-and-ifa-tracking-system-201-3-6>, retrieved on Jul. 24, 2014 (2 pages).

Enoch et al., "Cracking the Cross-Media Code: How to Use Single-Source Measures to Examine Media Cannibalization and Convergence," Journal of Advertising Research, vol. 50, No. 2, Jun. 2010 (12 pages).

Facebook for Business, "Measuring Conversions on Facebook, Across Devices and in Mobile Apps," Facebook, Aug. 14, 2014 (3 pages).

Fliptop, "Fliptop Person API Documentation," retrieved from <http://developer.fliptop.com/documentation>, retrieved on May 7, 2013 (6 pages).

Fliptop, "Get, Keep and Grow Customers with Fliptop's Customer Intelligence Application," retrieved from <http://www.fliptop.com/features#social_matching, retrieved on May 7, 2013 (3 pages).

Fliptop, "What is Fliptop?" retrieved from <http://www.fliptop.com/about_us>, retrieved on May 7, 2013 (1 page).

Headen et al., "The Duplication of Viewing Law and Television Media Schedule Evaluation," Journal of Marketing Research, vol. 16, Aug. 1979, pp. 333-340 (9 pages).

Hothorn et al., "Unbiased Recursive Partitioning: A Conditional Inference Framework," Journal of Computational and Geographical Statistics, vol. 15, No. 3, 2006, (21 pages).

Huang et al., "Modeling the Audience's Banner Ad Exposure for Internet Advertising Planning," Journal of Advertising, vol. 35, No. 2, Summer 2006, pp. 123-136 (15 pages).

International Searching Authority, "International Preliminary Report on Patentability," issued in connection with International Patent Application No. PCT/US2013/045211 dated Dec. 16, 2014 (8 pages).

International Searching Authority, "International Search Report and Written Opinion," issued in connection with corresponding International Patent Application No. PCT/US2014/052537 dated Dec. 4, 2014 (12 pages).

Launder, William, "Media Journal: Nielsen to Test Online-TV Viewing Tool," The Wall Street Journal, Apr. 30, 2013 (2 pages).

Protalinski, Emil, "Facebook Denies Cookie Tracking Allegations," Zdnet.com, retrieved from <http://www.zdnet.com/blog/facebook/facebook-denies-cookie-tracking-al-legations/4044>, Sep. 25, 2011 (2 pages).

Protalinski, Emil, "Facebook Fixes Cookie Behavior After Logging Out," Zdnet.com, retrieved from <http://www.zdnet.com/blog/facebook/facebook-fixes-cookie-behavior-aft-er-logging-out/41120>, Sep. 27, 2011 (2 pages).

Protalinski, Emil, "U.S. Congressmen Ask FTC to Investigate Facebook Cookies," Zdnet.com, retrieved from <http://www.zdnet.com/blog/facebook/us-congressmen-ask-ftc-to-investig-ate-facebook-cookies/4218>, Sep. 28, 2011 (2 pages).

Rapleaf, "The Consumer Data Marketplace," originally retrieved from <http://rapleaf.com/under-the-hood/> and originally retrieved on May 7, 2013, retrieved from <http://intelligence.towerdata/under-the-hood>, retrieved on Feb. 17, 2015 (3 pages).

Rapleaf, "Fast. Simple. Secure.," originally retrieved from <http://rapleaf.com/why-rapleaf/> and originally retrieved on May 7, 2013, retrieved from < http://intelligence.towerdata.com/why-towerdata>, retrieved on Feb. 17, 2015 (5 pages).

Rapleaf, "Frequently Asked Questions," retrieved from <http://rapleaf.com/about-us/faq/#where>, retrieved on May 7, 2013 (3 pages).

Rust et al., "A Comparative Study of Television Duplication Models," Journal of Advertising, vol. 10, No. 3, 1981, pp. 42-46, retrieved from <http://www.jstor.org/stable/4188365>, retrieved on Jun. 17, 2014 (6 pages).

The Nielsen Company (US), LLC, "How Teens Use Media: A Nielsen Report on the Myths and Realities of Teen Media Trends," Jun. 2009 (17 pages).

The Nielsen Company (US), LLC, "Nielsen Unveils New Online Advertising Measurement," Sep. 27, 2010, retrieved from <http://nielsen.com/us/en/insights/press-room/2010/nielsen_unveils_new-onlineadvertisingmeasure>, retrieved on May 31, 2012 (3 pages).

Sharma, Amol, "Nielsen Gets Digital to Track Online TV Viewers," The Wall Street Journal, Apr. 30, 2013 (2 pages).

United States Patent and Trademark Office, "Requirement for Restriction/Election," issued in connection with U.S. Appl. No. 13/915,381, dated Oct. 8, 2014 (6 pages).

Vega, Tanzina, "Nielsen Introduces New Ad Measurement Product," NY Times.com, Sep. 27, 2010, retrieved from <http://mediadecoder.blogs.nytimes.com/2010/09/27/nielsen-unveils-new-ad-measurement-product.html>, retrieved on Oct. 4, 2011 (1 page).

Vranica, Suzanne, "Nielsen Testing a New Web-Ad Metric," The Wall Street Journal.com, retrieved from <http://online.wsj.com/article/SB10001424052748704814204575508100589 71-5696.html>, retrieved on Sep. 1, 2011 (2 pages).

Wikipedia, "Mental Poker," Jan. 12, 2010, retrieved from <http://en.wikipedia.org/wiki/Mental_poker>, retrieved on Sep. 21, 2010 (5 pages).

Webmaster World, "JavaScript and AJAX Forum," retrieved from <http://webmasterworld.com/forum91/4465.html>, retrieved on Jun. 29, 2011 (4 pages).

IP Australia, "Patent Examination Report No. 1," issued in connection with Australian Patent Application No. 2014311451, dated Apr. 19, 2016, 6 pages.

Canadian Intellectual Property Office, "Office Action," issued in connection with Canadian Patent Application No. 2,889,349, dated Apr. 22, 2016, 5 pages.

X. Shi and P. Yu, "Dimensionality Reduction on Heterogeneous Feature Space," Data Mining (ICDM), 2012 IEEE International Conference on Data Mining, Brussels, Dec. 2012, pp. 635-644, 10 pages.

Korean Intellectual Property Office, "Notice of Allowance," issued in connection with application No. 10-2015-7010954, dated Nov. 7, 2016, 4 pages.

Korean Intellectual Property Office, "Notice of Final Rejection," issued in connection with application No. 10-2015-7010954, dated Aug. 30, 2016, 7 pages.

Japan Patent Office, "Reasons for Rejection," issued in connection with Japanese Patent Application No. P2015-549875, dated Jun. 28, 2016 (8 pages).

(56) References Cited

OTHER PUBLICATIONS

Korean Intellectual Property Office, "Certificate of Patent," issued in connection with application No. 10-2015-7010954, dated Feb. 8, 2017, 2 pages.
IP Australia, "Examination Report No. 2," issued in connection with application No. 201431145.1 dated Feb. 23, 2017, 5 pages.
European Patent Office, "European Search Report," issued in connection with application No. 14839065.1, dated Feb. 22, 2017, 8 pages.
European Patent Office, "Communication pursuant to Rules 70(2) and 70a(2) EPC," issued in connection with application No. 14839065.1, dated Mar. 10, 2017, 1 page.
Canadian Intellectual Property Office, "Second Office Action," issued in connection with application No. 2,889,349, dated Apr. 3, 2017, 3 pages.
Japanese Patent Office, "Certificate of Patent," issued in connection with application 2015-549875, dated Mar. 31, 2017, 3 pages.
The State Intellectual Property Office of China, "First Office Action," issued in connection with application No. 201480002842.9, dated May 3, 2017, 10 pages.
The State Intellectual Property Office of China, "Search Report" issued in connection with application No. 201480002842.9, dated Apr. 21, 2017, 4 pages.
IP Australia, "Examination Report No. 3," issued in connection with application No. 2014311451, dated Apr. 11, 2017, 8 pages.
State Intellectual Property of China, "Second Office Action," issued in connection with application No. 201480002842.9, dated Feb. 14, 2018, 10 pages.
Canadian Intellectual Property Office, "Third Office Action," issued in connection with application No. 2,889,349, dated Apr. 9, 2018, 4 pages.
Japanese Patent Office, "Notice of Allowance," issued in connection with application No. 2015-549875, dated Feb. 21, 2017, 5 pages.
Brazilian Patent Office, "Preliminary Office Action," issued in connection with Brazilian Patent Application No. 1120150095267, dated May 26, 2020, 6 pages.
The State Intellectual Property Office of China, "Third Office Action," issued in connection with application No. 201480002842.9, dated Aug. 30, 2018, 7 pages.
China National Intellectual Property Administration, "Fourth Office Action," issued in connection with application No. 201480002842.9, dated Jan. 14, 2019, 11 pages.
China National Intellectual Property Administration, "Decision of Rejection," issued in connection with application No. 201480002842.9, dated Apr. 24, 2019, 9 pages.
European Patent Office, "Communication pursuant to Article 94(3) EPC," issued in connection with application No. 14839065.1, dated Jun. 22, 2018, 4 pages.
European Patent Office, "Communication pursuant to Article 94(3) EPC," issued in connection with application No. 14839065.1, dated Apr. 8, 2019, 4 pages.
Canadian Intellectual Property Office, "Fourth Office Action," issued in connection with application No. 2,889,349, dated Mar. 15, 2019, 5 pages.
Canadian Intellectual Property Office, "Fifth Office Action," issued in connection with application No. 2,889,349, dated Apr. 1, 2020, 6 pages.
Korean Intellectual Property Office, "Notice of Preliminary Rejection," issued in connection with application No. 10-2017-7003503, dated Nov. 13, 2019, 8 pages.
Korean Intellectual Property Office, "Notice of Final Rejection," issued in connection with application No. 10-2017-7003503, dated May 22, 2020, 6 pages.
Korean Intellectual Property Office, "Notice of Preliminary Rejection," issued in connection with application No. 10-2017-7003503, dated Oct. 24, 2020, 79 pages.
Korean Intellectual Property Office, "Notice of Final Rejection," issued in connection with application No. 10-2017-7003503, dated Dec. 7, 2020, 8 pages.
European Patent Office, "Communication pursuant to Article 94(3) EPC," issued in connection with application No. 14839065.1, dated Oct. 27, 2020, 2 pages.
United States Patent and Trademark Office, "Non-Final Office Action," issued in connection with U.S. Appl. No. 14/142,411, dated Mar. 7, 2016, 23 pages.
United States Patent and Trademark Office, "Final Office Action," issued in connection with U.S. Appl. No. 14/142,411, dated Jul. 8, 2016, 44 pages.
United States Patent and Trademark Office, "Non-Final Office Action," issued in connection with U.S. Appl. No. 14/142,411, dated Aug. 7, 2017, 151 pages.
United States Patent and Trademark Office, "Final Office Action," issued in connection with U.S. Appl. No. 14/142,411, dated Dec. 21, 2017, 144 pages.
United States Patent and Trademark Office, "Advisory Action," issued in connection with U.S. Appl. No. 14/142,411, dated Mar. 1, 2018, 3 pages.
United States Patent and Trademark Office, "Non-Final Office Action," issued in connection with U.S. Appl. No. 14/142,411, dated Aug. 31, 2018, 151 pages.
United States Patent and Trademark Office, "Notice of Allowance," issued in connection with U.S. Appl. No. 14/142,411, dated Feb. 4, 2019, 8 pages.
Canadian Intellectual Property Office, "Sixth Office Action," issued in connection with application No. 2,889,349, dated Feb. 2, 2021, 3 pages.
Korean Intellectual Property Office, "Notice of Preliminary Rejection," issued in connection with Korean Application No. 10-2021-7010954, dated May 27, 2021, 8 pages.
Korean Intellectual Property Office, "Notice of Allowance," issued connection with Korean Application No. 10-2017-7003503, dated Oct. 27, 2021, 4 pages.
Korean Intellectual Property Office, "Notice of Allowance," issued connection with Korean Application No. 10-2021-7000403, dated Sep. 30, 2021, 4 pages.
Canadian Intellectual Property Office, "Notice of Allowance," issued in connection with Canadian Patent Application No. 2,889,349, dated Jan. 4, 2022, 1 page.
Korean Intellectual Property Office, "Notice of Allowance," issued in connection with Korean Patent Application No. 10-2021-7043299, dated Jan. 19, 2022, 4 pages.

\* cited by examiner

| ASSET (120) | RULES (122) | ASSET DEMOGRAPHICS (124) | DEMOGRAPHICS TAG (126) |
|---|---|---|---|
| THE DAILY SHOW WITH JON STEWART | 10PM-10:30PM (CST) MONDAY-THURSDAY | 70% MALE AGE 20-29; 20% FEMALE AGE 20-29; 6% MALE LESS THAN AGE 20; 4% FEMALE LESS THAN AGE 20 | TAG A |
| TWILIGHT (BOOK) | AMAZON.COM; TUNES | 30% FEMALE LESS THAN AGE 20; 25% FEMALE AGE 20-25; 20% FEMALE AGE 40-50; 12% MALES LESS THAN AGE 20; 10% MALE AGE 20-25; 3% MALE AGE 40-50 | TAG B |
| NECKLACE | AMAZON.COM | 70% FEMALE; 30% MALE | TAG C |
| END OF THE WORLD (MOVIE) | AMAZON.COM; ITUNES | 60% MALE; 40% FEMALE | TAG D |
| END OF THE WORLD (SONG) | AMAZON.COM; ITUNES; PANDORA | 70% AGE 20-29; 20% AGE LESS THAN 20; 10% AGE 30-39 | TAG E |

FIG. 2

| USER IDENTIFIER | DEMOGRAPHICS TAG | MESSAGE IDENTIFIER | MESSAGE KEYWORDS | ASSET | MESSAGE TIMESTAMP |
|---|---|---|---|---|---|
| @USER1 | TAG B | 101101 | I JUST BOUGHT VIA @AMAZON | TWILIGHT (BOOK) | 11/10/2013 9:45:05 AM |
| @USER2 | TAG A | 101102 | I'M WATCHING VIA @HULU | THE DAILY SHOW WITH JON STEWART | 11/11/2013 11:15:00 PM |
| @USER3 | TAG C | 101103 | I JUST BOUGHT VIA @AMAZON | NECKLACE | 11/13/2013 12:31:16 PM |
| @USER2 | TAG D | 101104 | AMAZON INSTANT VIDEO VIA @AMAZON | END OF THE WORLD (MOVIE) | 11/13/2013 8:59:49 PM |
| @USER3 | TAG A | 101105 | I'M WATCHING VIA @HULU | THE DAILY SHOW WITH JON STEWART | 11/14/2013 11:21:06 PM |
| @USER2 | TAG E | 101106 | I'M LISTENING TO ON PANDORA | END OF THE WORLD (SONG) | 11/14/2013 11:21:06 PM |

FIG. 5

| USER IDENTIFIER (112) | ASSET DEMOGRAPHICS (124) | DEMOGRAPHICS ANALYSIS RESULTS (610) | ESTIMATED USER DEMOGRAPHICS (612) |
|---|---|---|---|
| @USER1 (602) | 30% FEMALE LESS THAN AGE 20; 25% FEMALE AGE 20-25; 20% FEMALE AGE 40-50; 12% MALES LESS THAN AGE 20; 10% MALE AGE 20-25; 3% MALE AGE 40-50 | 30% FEMALE LESS THAN AGE 20; 25% FEMALE AGE 20-25; 20% FEMALE AGE 40-50; 12% MALES LESS THAN AGE 20; 10% MALE AGE 20-25; 3% MALE AGE 40-50 | FEMALE LESS THAN AGE 20 |
| @USER2 (604) | 70% MALE AGE 20-29; 20% FEMALE AGE 20-29; 6% MALE LESS THAN AGE 20; 4% FEMALE LESS THAN AGE 20 / 60% MALE; 40% FEMALE / 70% AGE 20-29; 20% AGE LESS THAN 20; 10% AGE 30-39 | 54% MALE AGE 20-29; 26% FEMALE AGE 20-29; 10% MALE LESS THAN AGE 20; 5% FEMALE LESS THAN AGE 20; 3% MALE AGE 30-39; 2% FEMALE AGE 30-39 | MALE AGE 20-29 |
| @USER3 (606) | 70% FEMALE; 30% MALE / 70% MALE AGE 20-29; 20% FEMALE AGE 20-29; 6% MALE LESS THAN AGE 20; 4% FEMALE LESS THAN AGE 20 | 48% MALE AGE 20-29; 42% FEMALE AGE 20-29; 5% MALE LESS THAN AGE 20; 5% FEMALE LESS THAN AGE 20 | MALE AGE 20-29 |

FIG. 6

METHODS AND APPARATUS TO ESTIMATE DEMOGRAPHICS OF USERS EMPLOYING SOCIAL MEDIA

RELATED APPLICATION

This patent arises from a continuation of U.S. patent application Ser. No. 14/142,411, filed on Dec. 27, 2013, which claims priority to U.S. Provisional Patent Application Ser. No. 61/871,243, filed on Aug. 28, 2013, all of which are hereby incorporated by reference in their entireties.

FIELD OF THE DISCLOSURE

This disclosure relates generally to audience measurement, and, more particularly, to methods and apparatus to estimate demographics of users employing social media.

BACKGROUND

Audience measurement of media (e.g., any type of content and/or advertisements such as broadcast television and/or radio, stored audio and/or video played back from a memory such as a digital video recorder or a digital video disc, a webpage, audio and/or video presented (e.g., streamed) via the Internet, a video game, etc.) often involves collection of media identifying data (e.g., signature(s), fingerprint(s), code(s), tuned channel identification information, time of exposure information, etc.) and people data (e.g., user identifier(s), demographic data associated with audience member(s), etc.). The media identifying data and the people data can be combined to generate, for example, media exposure data indicative of amount(s) and/or type(s) of people that were exposed to specific piece(s) of media.

BRIEF DESCRIPTION OF THE DRAWINGS

FIG. 2 is an example data table that may be stored by the example audience measurement entity of FIG. 1.

FIG. 5 is an example data table storing data representing social media user identifiers tagged with asset demographics that may be collected by the example audience measurement entity server of FIGS. 1, 3 and 4.

FIG. 6 is a an example data table storing data representing estimated demographics corresponding to social media user identifiers that may be collected by the example audience measurement entity server of FIGS. 1, 3 and 4.

DETAILED DESCRIPTION

Figure 1:
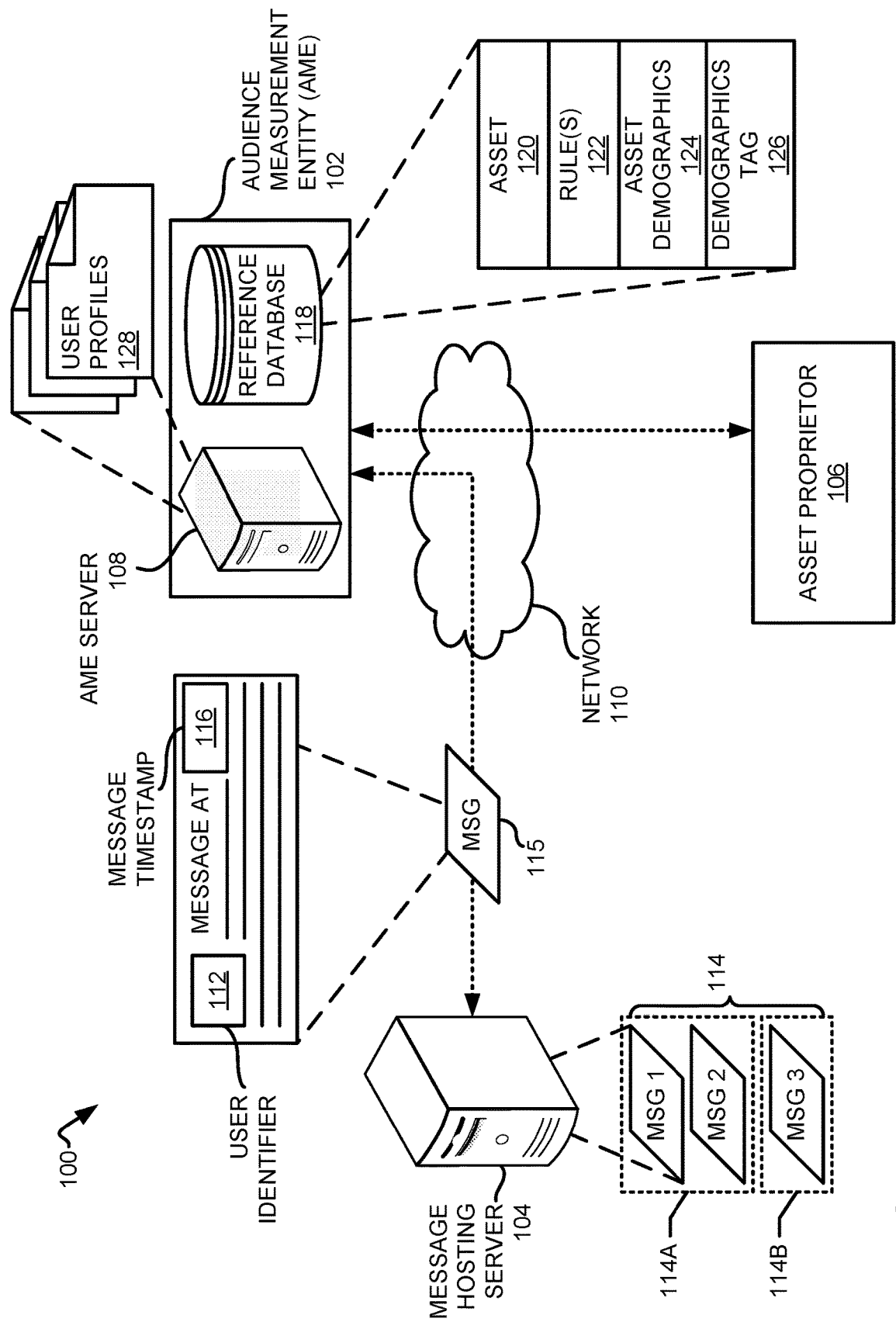
FIG. 1 is a diagram of an example system constructed in accordance with the teachings of this disclosure to estimate demographics of users employing social media.

Example methods, systems and apparatus disclosed herein may be used to impute demographic information of a known first group of people onto an unknown second group of people. For example, techniques disclosed herein enable estimating demographics of users employing social media.

Social messaging has become a widely used medium in which users disseminate and receive information. Online social messaging services (such as Twitter or Facebook) enable users to send social media messages or instant messages to many users at once. Some social messaging services enables users to "follow" or "friend" other users (e.g., subscribe to receive messages sent by select users (e.g., via the Twitter® service), status updates (e.g., via the Facebook® service or Google+™ social service), etc.). For example, a user following (e.g., subscribed to, online friends with, etc.) a celebrity in the Twitter® service may receive indications via a client application (e.g., the TweetDeck® client application or any other social media messaging client application) when the celebrity sends or posts a social media message.

Social media messages (sometimes referred to herein as "messages," "statuses," "texts" or "tweets") may be used to convey many different types of information. In some examples, social media messages are used to relay general information about a user. For example, a message sender may send a social media message indicating that they are bored. In some examples, social media messages are used to convey information self-reporting activity by the message sender regarding an asset such as a media event, product or service. For example, a message sender may convey a social media message indicating that the message sender is watching a certain television program, listening to a certain song, or just purchased a certain book. Asset-regarding social media messages are social media messages that are disseminated to a mass audience and indicate exposure to the asset. In some examples disclosed herein, social media messages are collected and then filtered to identify asset-regarding social media messages.

It is useful, however, to link demographics and/or other user information to the message senders. For example, companies and/or individuals want to understand the reach and exposure of the asset (e.g., a media event, a product and/or a service) that they deliver, produce and/or provide. For example, a media event that is associated with larger numbers of exposure and/or larger numbers of occurrences of an association may be considered more effective at influencing user behavior.

In some examples, demographics developed for a panel (e.g., a television panel, a loyalty card panel, etc.) are used to infer demographics for users of online social messaging services who send social media messages regarding the same asset such as a media event, a product and/or a service. In some examples, panelist demographics developed for a first media event such as television programs, advertisements, etc. may be used to estimate demographics of users of social media posting contemporaneous messages and/or near contemporaneous messages concerning the media event. For example, time-stamped records identifying exposure to the media event (e.g., television content and/or advertisements) and time-stamped social media messages commenting on the media event are identified. Users who post messages corresponding to (e.g., mentioning and/or referencing) the media of interest (e.g., television content and/or advertisement) within a time window close to (e.g., adjacent, falls within a threshold time of and/or overlapping with) a time window of presentation of the corresponding media are assumed to be in the audience of the referenced media event and, thus, within demographics of the audience of the media event. The demographics for the media event (e.g., an asset of interest) may be identified by, for example, an audience measurement entity (e.g., The Nielsen Company (US), LLC) based on a panel of consumers. The demographics for a single media event (e.g., a particular television show and/or advertisement) may be spread across many demographic segments (e.g., 20% males age 20-25, 25% females age 20-25, 10% males less than age 20, 3% female less than age 20, 30% males age 40-50, 12% females age 40-50). Therefore, identifying social media users as being in the audience of that single media event provides an indication that the user fits within one of any of these demographic segments (sometimes referred to herein as "demographic buckets," "demographic pools," "demographic categories," "demographic composition" or "market breaks"). The percentage composition of the audience may be used as a proxy for the likelihood that the social media user fits into one of the demographic buckets (e.g., a 12% chance the user is female age 40-50). These percentages may be modified based on known social media usage patterns. For example, if females age 40-50 are more likely to use social media than males age 40-50, the percentages of the demographic composition may be weighted or otherwise adjusted to reflect those likelihoods.

While using one user message regarding a media event may not be a precise indicator of the demographics of the social network user given the breadth of demographics associated with such an event, aggregating messages by the same user for multiple media events results in increasing granularity and/or accuracy. For example, statistical methods such as Bayesian analysis may be applied to the different demographic pools associated with different media events for which the same user is known to have sent a social media message (e.g., is known to have been in the audience for the media event) to obtain a more precise demographics estimation of that user. For example, if a second media event for which the social media user sends a message is only 1% female age 40-50, and no males age 40-50, and 50% female age 20-25, then joining the set of probabilities for the second media event with the set of probabilities for the first media event for the example above, the likelihood of the social media user being a female aged 40-50 or a male aged 40-50 are decreased and the likelihood of the user being a male age 20-25 is greatly increased.

Demographic information may be used from different types of panels to estimate the demographics of social media users. For example, demographics from a television panel may be used as explained above. Alternatively, demographics from a consumer purchase panel (e.g., Nielsen's Homescan™ panel, a loyalty card panel, etc.) may be used. Participants enrolled in Homescan™ scan product identifiers (e.g., barcodes) after purchasing the product. A panelist identifier is associated with the product identifier, and, as the demographics for the panelist are known, demographic information for the corresponding product can be determined. In some examples, demographics for two or more different types of panels are used (e.g., a television panel and the Homescan™ panel). For example, a social media user may send a first message mentioning a television program or a characteristic of a television program and then send a second message mentioning a product (e.g., running shoes) or a characteristic of a product. In some examples, known demographics of viewers of the television program collected via, for example, a television panel, may be combined with known demographics of persons who purchased the running shoes collected via, for example, a Homescan™ panel, to estimate demographics of the social media user.

In some examples, certain asset proprietors (e.g., distributors, producers and/or providers of assets such as a retailer (e.g., Amazon.com)) enable a user to post a message (e.g., a tweet, a status update, etc.) after the user has made a purchase. In some examples, when a user elects to post a message, the message may include a specific phrase such as "I just bought," the asset purchased (e.g., "a box of protein bars"), and an asset proprietor identifier (e.g., "via @Amazon"). In some examples, the asset proprietor may record an identifier (e.g., a Twitter handle) for the user when posting the message. In some such examples, the asset proprietor may associate demographic information with the user informed from past purchases made by the user and/or other users.

In some examples, the asset proprietor may not record an identifier of the social media user when the user posts the message. Example methods disclosed herein identify a set of posted messages associated with the purchase of a particular asset (e.g., an asset of interest such as protein bars), thereby enabling collecting a set of associated user identifiers. Each of the user identifiers may be associated with demographics associated with that particular asset. As discussed above, while one instance of a posted message provides some demographic information regarding the message poster, collecting demographics associated with a plurality of messages posted by the user enables generating a more granular (e.g., specific) and/or more accurate user demographics profile. Thus, examples disclosed herein analyze the plurality of messages over time to predict the demographics associated with a particular user via the user identifiers. In some examples, statistical analysis (e.g., Bayesian analysis, principal component analysis, etc.) is used to develop the demographics estimate. In some examples, different weights are associated with the respective demographics to generate a demographic profile of greater accuracy and precision.

FIG. 1 is an illustration of an example environment 100 in which examples disclosed herein may be implemented to estimate demographics of users employing social media. The example environment 100 of FIG. 1 includes an audience measurement entity (AME) 102, a message hosting server 104 and an asset proprietor 106. The AME 102 of the illustrated example is an entity that monitors and/or reports posts of social media messages. In the illustrated example of FIG. 1, the AME 102 operates and/or hosts an example AME server 108. The AME server 108 of the illustrated example is a server and/or database that collects and/or receives social media messages related to assets (e.g., media events, products and/or services) and estimates demographics of the message posters. In some examples, the AME server 108 is implemented using multiple devices and/or the message hosting server 104 is implemented using multiple devices. For example, the AME server 108 and/or the message hosting server 104 may include disk arrays or multiple workstations (e.g., desktop computers, workstation servers, laptops, etc.) in communication with one another. In the illustrated example, the AME server 108 is in selective communication with the message hosting server 104 and/or the asset proprietor 106 via one or more wired and/or wireless networks represented by network 110. Example network 110 may be implemented using any suitable wired and/or wireless network(s) including, for example, one or more data buses, one or more Local Area Networks (LANs), one or more wireless LANs, one or more cellular networks, the Internet, etc. As used herein, the phrase "in communication," including variances thereof, encompasses direct communication and/or indirect communication through one or more intermediary components and does not require direct physical (e.g., wired) communication and/or constant communication, but rather additionally includes selective communication at periodic or aperiodic intervals, as well as one-time events.

In the illustrated example of FIG. 1, an online social messaging service operates and/or hosts the message hosting server 104 that responds to requests for social media messages by the AME server 108. Additionally or alternatively, the message hosting server 104 may be in communication with a geographically separate messages database (e.g., a server of a third-party contracted by the online social messaging service) that hosts the social media messages. In such examples, the message hosting server 104 retrieves messages from the separate messages database to serve the messages to the requesting AME server 108. Alternatively, the separate messages database may be provided with a server to serve the hosted messages directly to the requesting AME server 108. In addition, for simplicity, only one message hosting server 104 is shown in FIG. 1, although multiple message hosting servers are likely to be present.

In the illustrated example, a user signs into an online social media service with a user identifier (e.g., an example user identifier 112) in order to read and/or convey (or send) social media messages. The example user identifier 112 is then associated with the activities for the user. For example, the user identifier 112 may be displayed (or presented) along with the social media message.

In the illustrated example, when a message sender posts or sends a social media message 114, that social media message 114 is sent to the message hosting server 104. The example message hosting server 104 hosts asset-regarding social media messages 114A and non-asset regarding social media messages 114B. In the illustrated example, asset-regarding social media messages 114A include reference(s) (e.g., text) at least partially directed to an asset of interest and also include characteristics indicating exposure to the asset of interest. For example, an asset of interest may be "The Daily Show with Jon Stewart." In such instances, an asset-regarding social media message 114A may include the text "Jon Stewart is really funny on The Daily Show right now!" and may include a message timestamp 116 indicating that the asset-regarding social media message 114A was posted by the message sender during broadcast of the asset of interest.

In contrast, a non-asset regarding social media message 114B does not include reference to an asset of interest and/or does not include a characteristic indicating exposure to an asset of interest. For example, a non-asset regarding social media message 114B may include reference to an asset of interest (e.g., the text "Just ran into Jon Stewart from The Daily Show at my favorite pizza parlor!"), but the message may not have been posted by the message sender during broadcast times associated with the television show. In the illustrated example, the message hosting server 104 serves asset-regarding social media messages 114A and non-asset regarding social media messages 114B to the AME server 108 in the same manner. For example, the message hosting server 104 processes a request for a social media message 114 similarly regardless of whether the social media message 114 is an asset-regarding social media message 114A or a non-asset regarding social media message 114B.

In the illustrated example of FIG. 1, the asset proprietor 106 distributes and/or provides media events, products and/or services to large numbers of subscribers. In exchange for the provision of the asset, the subscribers register with the asset proprietor 106. As part of this registration, the subscribers provide detailed user demographic information. Examples of such asset proprietors 106 include retailers and/or service providers such as Amazon.com, eBay, Pandora, Hulu, etc.

The example AME server 108 of the illustrated example operates to impute demographic information of a known first group of people onto an unknown second group of people. For example, to infer demographics for users of social media who send social media messages regarding an asset, the AME server 108 may use demographics developed for a panel (e.g., a television panel, a loyalty card panel, etc.). In some examples, the AME server 108 periodically and/or aperiodically queries the message hosting server 104 for social media messages using a keywords list. Returned social media messages 115 by the message hosting server 104 are processed to determine whether they correspond to an asset of interest such as a media event, a product and/or a service. In the example of FIG. 1, the social media messages 114 and 115 are the same message at two different points in time. Message 114 is the message prior to being served to the AME server 108 (e.g., while hosted at the message hosting server 104). Message 115 is the message after serving. The example AME server 108 identifies the user identifier 112 associated with the returned social media message 115 and tags the user identifier 112 with known demographic information for the asset.

In the illustrated example, to tag the user identifier 112 with known demographic information for an asset of interest, the AME 102 of the illustrated example also collects and/or has access to demographic information for the asset(s) of interest. For example, the AME 102 may collect media identifying information indicative of particular media being presented in a media exposure environment (e.g., a television room, a family room, a living room, a bar, a restaurant, a store, a cafeteria, etc.) by a media presentation device such as a television and store the demographic information. The AME 102 may then correlate data collected from a plurality of panelist sites with the demographics of the panelists at those sites. For example, for each panelist site wherein a first piece of media is detected in the monitored environment at a first time, media identifying information for the first piece of media is correlated with presence information detected in the environment at the first time. The data and/or results from multiple panelist sites are combined and/or analyzed to provide demographic information representative of exposure of a population as a whole to the first piece of media.

In the illustrated example of FIG. 1, the AME 102 includes an example reference database 118 to identify assets of interest and to tag user identifiers 112 associated with asset-regarding social media messages 114A with known demographic information (e.g., a set of different demographic buckets corresponding to a known audience composition) of the asset included in the reference database 118. As described in detail below, the example reference database 118 may include, for example, an asset of interest identifier 120 (e.g., "The Daily Show with Jon Stewart"), one or more rule(s) 122 associated with the asset (e.g., airs between 10:00 p.m. Central Standard Time (CST) and 10:30 p.m. CST Monday through Thursday), known demographic information 124 about the asset (e.g., segments or market breaks such as 70% male age 20-29, 20% female age 20-29, 6% male less than age 20, 4% female less than age 20), and a demographics tag 126 associated with the demographic segments (e.g., tag A). The example reference database 118 may include a volatile memory (e.g., a Synchronous Dynamic Random Access Memory (SDRAM), Dynamic Random Access Memory (DRAM), RAMBUS Dynamic Random Access Memory (RDRAM, etc.) and/or a non-volatile memory (e.g., flash memory). The example reference database 118 may include one or more double data rate (DDR) memories, such as DDR, DDR2, DDR3, mobile DDR (mDDR), etc. The example reference database 118 may additionally or alternatively include one or more mass storage devices such as hard drive disk(s), compact disk drive(s), digital versatile disk drive(s), etc. While in the illustrated example the reference database 118 is illustrated as a single database, the reference database 118 may be implemented by any number and/or type(s) of databases.

In some examples, the AME 102 uses demographics from a consumer purchase panel (e.g., Nielsen's Homescan™ panel, a loyalty card panel, Nielsen television panel, Nielsen online panel, Nielsen radio panel, etc.). In such panelist-based systems (e.g., television panels, consumer purchase panels, etc.), user demographic information is obtained from a user when, for example, the user joins and/or registers for the panel (e.g., consents to being monitored into a panel). The user demographic information (e.g., race, age or age range, gender, income, education level, etc.) may be obtained from the user, for example, via a telephone interview, an in-person interview, by having the user complete a survey (e.g., an online survey), etc. In some examples, the AME 102 uses the collected demographic information from the enrolling people (e.g., panelists) so that subsequent correlations may be made between asset exposure to those panelists and different demographic markets. For example, the AME 102 may monitor those panel members to determine assets (e.g., media events, products, services, etc.) exposed to those panel manners. The AME 102 then compiles the collected data into statistical reports accurately identifying different demographic buckets of persons exposed to the asset.

In some examples, the AME 102 may collect and/or obtain the asset demographic information 124 from the asset proprietor 106. In some such examples, the AME 102 may leverage the existing databases of the asset proprietor 106 to collect more extensive asset demographic information 124 and/or user data for associating with users of social media. Collecting user demographic information associated with registered panelists and/or users of the asset proprietor 106 enables the AME 102 to extend or supplement their panel data with substantially reliable demographic information from external sources (e.g., the asset proprietor 106), thereby extending the coverage, accuracy, and/or completeness of their known demographic information for assets. The use of demographic information from disparate data sources (e.g., high-quality demographic information from the panel(s) of an audience measurement entity and/or registered user data of the asset proprietor 106) results in improved prediction of the demographics associated with a particular user of social media by the AME 102.

In the illustrated example, the AME server 108 generates user profiles 128 for users using the demographic information 124 associated with the user via their user identifier 112. For example, the AME server 108 may periodically and/or aperiodically identify the demographic tags 126 associated with the user identifier 112 and perform statistical analysis such as Bayesian analysis of the corresponding demographics. In some examples, the AME server 108 performs statistical analysis of the variations within the demographics to generate the user profile 128. In some examples, the AME server 108 combines the demographic composition of multiple events for a same user (e.g., one or more exposures to one or more television shows and/or one or more product purchases) to more accurately determine the demographics for the user. For example, combining the likelihoods that the user fits into different demographic categories based on different audience compositions from two or more events results in a combined set of likelihoods for the user's demographics. The demographic categories (e.g., segments or market breaks) with the highest likelihood are identified as the demographics for the user. Larger numbers of events/audience participation that can be associated with a given user over time (e.g., via the user identifier 112) achieve better accuracy of the demographics imputations. The AME 102 of the illustrated example may provide the generated profiles 128 to companies and/or individuals that produce the asset.

FIG. 2 illustrates an example data table 200 that may be stored by the example reference database 118 of the example AME 102 of FIG. 1 to facilitate associating users of social media services with demographic information. In the illustrated example of FIG. 2, the data table 200 associates an asset identifier 120 with one or more rule(s) 122, asset demographic information 124 and a demographics tag 126. The association is accomplished by putting data in the appropriate column of the same row of the data table 200. In the illustrated example, the asset identifier 120 identifies an asset of interest such as a television program (e.g., the asset (The Daily Show with Jon Stewart) of row 202), a book (e.g., the asset (Twilight(book)) of row 204), a product (e.g., the asset (necklace) of row 206), etc. The example one or more rule(s) 122 include one or more values and/or data corresponding to criteria associated with the corresponding asset identifier 120. In some examples, the one or more rule(s) 122 include time blocks during which a television show airs. For example, in row 202, the one or more rule(s) 122 associated with the asset (The Daily Show with Jon Stewart) indicate that the asset (The Daily Show with Jon Stewart) is broadcast Monday through Thursday and between 10:00 p.m. Central Standard Time (CST) and 10:30 p.m. (CST). In some examples, the one or more rule(s) 122 include vendors and/or merchants that sell products and/or provide media (e.g., assets of interest) included in the reference database 118. For example, in row 208, the one or more rule(s) 122 associated with the asset (End of the World (movie)) indicate that the asset (End of the World (movie)) may be accessed (e.g., purchased, streamed, etc.) from Amazon.com and/or through iTunes®.

As discussed above, demographic information for an asset may be collected and/or leveraged by the AME 102. The data table 200 of FIG. 2 includes the asset demographic information 124 (e.g., demographic segments, market breaks, etc.) associated with the corresponding asset. The asset demographic information 124 may include data and/or value(s) indicative of one or more of an age or age range (e.g., 20-29), gender, education level, etc. associated with the asset identifier 120. In some examples, the AME 102 collects and/or has access to demographic information for the asset(s) of interest. For example, the AME 102 may correlate data collected from a plurality of monitored panelist sites with the demographics of the panelists at those sites and/or user demographic information associated with registered panelists and/or users of the asset proprietor 106. For example, in row 206, the asset demographic information 124 associated with the asset (necklace) indicates that a purchaser of the asset (necklace) has a 70% likelihood of being a female and a 30% likelihood of being a male. Further, in row 210, the asset demographic information 124 associated with the asset (End of the World (song)) indicates that a user who accesses (e.g., purchases, streams, etc.) the asset (End of the World (song)) has a 70% likelihood of being between the ages of 20-29, a 20% likelihood of being less than 20 years of age, and 10% likelihood of being between the ages of 30-39. In the illustrated example of FIG. 2, the demographics tag 126 corresponds to the asset demographic information 124 and may be used to refer to the demographic segments of the associated asset identifier 120. For example, in row 206, the demographics tag 126 associated with the asset (necklace) indicates that the demographic segments of the asset (necklace) may be referred to by a tag (Tag C). One or more demographic tags (e.g., one or more values or data) may apply to any given asset. Thus, the demographics tag 126 may be populated with one or more tags.

Figure 3:
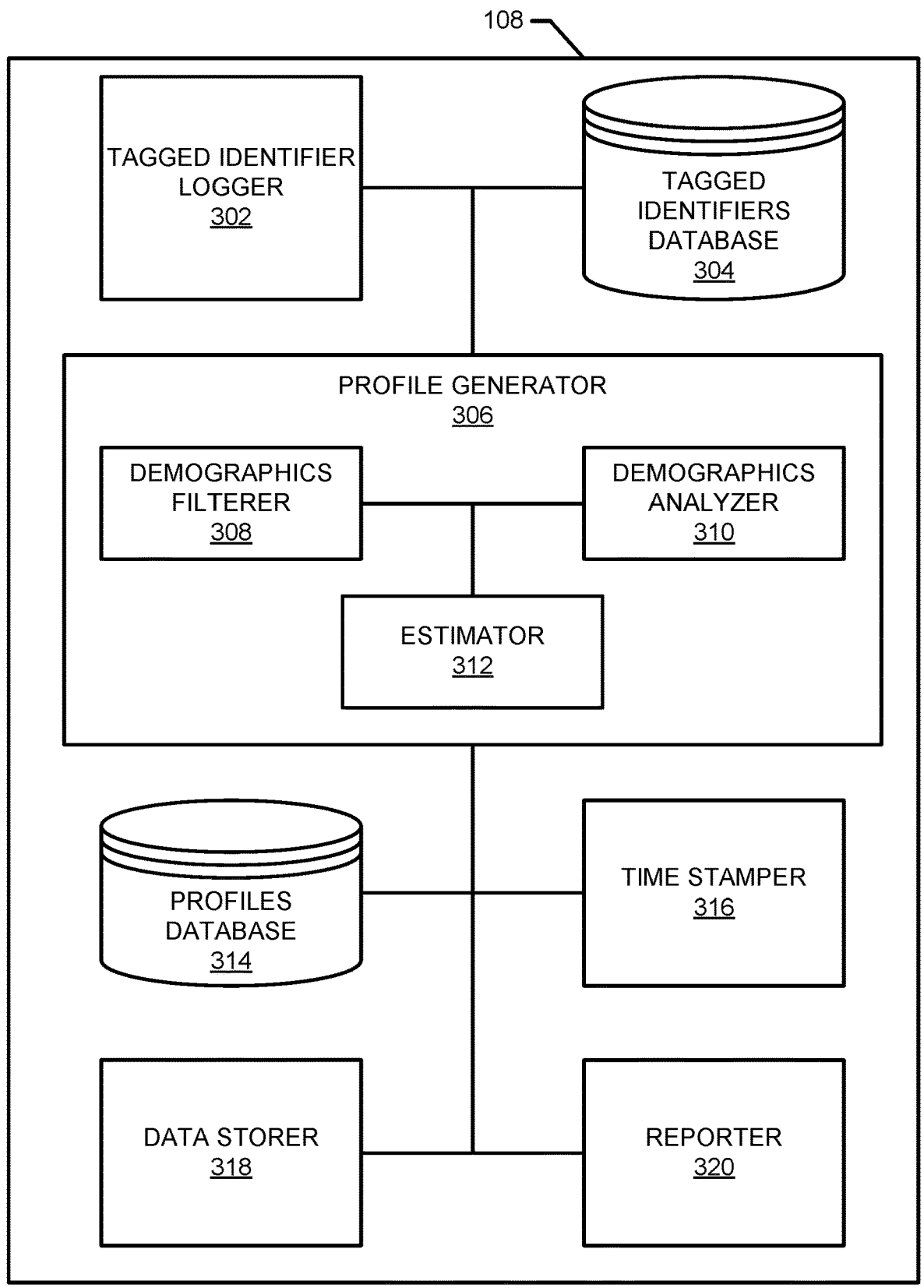
FIG. 3 is a block diagram of an example implementation of the audience measurement entity server of FIG. 1 that may facilitate estimating demographics of users employing social media.

FIG. 3 is a block diagram of an example implementation of the audience measurement entity (AME) server 108 of FIG. 1 that may facilitate estimating demographics of users employing social media. The example AME server 108 of the illustrated example includes an example tagged identifier logger 302, an example tagged identifiers database 304, an example profile generator 306, an example profiles database 314, an example time stamper 316, an example data storer 318 and an example reporter 320.

In the illustrated example of FIG. 3, the AME server 108 includes the example tagged identifier logger 302 to log user identifiers associated with social media messages posted by users regarding assets of interest. As described in detail below, the example tagged identifier logger 302 tags a user identifier 112 associated with the asset-regarding social media message 114a with known demographic information associated with the asset. For example, the tagged identifier logger 302 may query message hosting servers (e.g., the message hosting server 104 of FIG. 1) for social media messages 114 associated with an asset identifier 120. The example tagged identifier logger 302 processes the returned social media message 115 and when the example tagged identifier logger 302 of the illustrated example determines that the returned social media message 115 includes reference to an asset of interest and includes characteristics indicating exposure to the asset of interest (e.g., the returned social media message 115 is an asset-regarding social media message 114A), the tagged identifier logger 302 uses the example reference database 118 of FIG. 1 to identify demographic information associated with the identified asset. The example tagged identifier logger 302 of FIG. 3 identifies the user identifier 112 associated with the asset-regarding social media message 114A and tags (e.g., associates) the user identifier 112 with the asset demographic information 124 retrieved from the reference database 118.

In the illustrated example of FIG. 3, the tagged identifier logger 302 stores the record of the tagged user identifier in the example tagged identifiers database 304. The tagged identifiers database 304 may include a volatile memory (e.g., a Synchronous Dynamic Random Access Memory (SDRAM), Dynamic Random Access Memory (DRAM), RAMBUS Dynamic Random Access Memory (RDRAM, etc.) and/or a non-volatile memory (e.g., flash memory). The tagged identifiers database 304 may include one or more double data rate (DDR) memories, such as DDR, DDR2, DDR3, mobile DDR (mDDR), etc. The tagged identifiers database 304 may additionally or alternatively include one or more mass storage devices such as hard drive disk(s), compact disk drive(s), digital versatile disk drive(s), etc. While in the illustrated example the tagged identifiers database 304 is illustrated as a single database, the tagged identifiers database 304 may be implemented by any number and/or type(s) of databases.

In the illustrated example of FIG. 3, the AME server 108 includes the example profile generator 306 to generate user profiles 128 including estimated demographics for the corresponding users who post social media messages regarding assets of interest (e.g., the example asset-regarding social media messages 114A). For example, the profile generator 306 may periodically and/or aperiodically process a user identifier 112 included in the tagged identifiers database 304 and perform statistical analysis of the asset demographic information 124 tagged to the user identifier 112. Using the results of the analysis, the example profile generator 306 estimates demographics for the user associated with the user identifier 112.

In some examples, the profile generator 306 generates user profiles 128 when requested. For example, the profile generator 306 may receive a request from, for example, the example reporter 320 to generate a user profile 128 for a certain user. In some examples, the profile generator 306 generates user profiles 128 aperiodically (e.g., when the profile generator 306 detects a change in information stored in the example tagged identifiers database 304). For example, when the tagged identifier logger 302 records a tagged identifier in the tagged identifiers database 304, the profile generator 306 may detect the new record and process the new record. For example, the profile generator 306 may update a previously generated user profile 128 associated with the user identifier 112 of the new record. In some examples, the profile generator 306 periodically generates a user profile 128. For example, the profile generator 306 may generate a user profile 128 for the one or more user identifiers 112 included in the tagged identifiers database 304 every 24 hours. The profile generator 306 of the illustrated example includes an example demographics filterer 308, an example demographics analyzer 310 and an example estimator 312.

In the illustrated example of FIG. 3, the profile generator 306 includes the example demographics filterer 308 to identify demographic information associated with a specific user identifier. For example, the demographics filterer 308 may parse the tagged identifiers database 304 and identify the different demographics tagged to the user identifier 112. In some examples, the demographics filterer 308 sorts and/or combines the records in the tagged identifiers database 304 based on the distinct user identifiers 112. For example, the demographic filterer 308 may link together one or more demographic tags 126 associated with the user identifier 112. In some examples, the demographics filterer 308 may aggregate demographic information for two or more user identifiers 112 included in the tagged identifiers database 304. For example, the demographics filterer 308 may associate different user identifiers 112 with the same user. For example, the demographics filterer 308 may access a data structure such as a lookup table, a file, a database, a list, etc. that cross-references based on information received from, for example, one or more asset proprietors 106. For instance, a user may register with a first online social media service using a first user identifier (e.g., "@John Doe") and register with a second online social media service using a second user identifier (e.g., "Johnny_Doe"). In some examples, the demographics filterer 308 may identify two or more user identifiers that are sufficiently the same (e.g., the user identifiers "@Jane_Doe," "Jane Doe" and "Doe, Jane") and associate the different user identifiers with the same user. In some such examples, the demographics filterer 308 combines the demographic information tagged to the first user identifier and the second user identifier to generate the profile for the user.

In the illustrated example of FIG. 3, the profile generator 306 includes the example demographics analyzer 310 to analyze the demographic information identified by the demographic tags 126 and determine the likelihoods that the user fits into different demographic buckets. In some examples, the demographics analyzer 310 performs statistical analysis of the variations within the identified demographics associated with the user. For example, the demographics analyzer 310 may apply Bayesian analysis or principal component analysis to the different demographics to develop the likelihoods. In some such examples, the demographics analyzer 310 applies statistical methods (e.g., Bayesian analysis) to the different demographic pools associated with the user to obtain a more precise demographic estimation of that user. For example, combining the likelihoods that the user fits into different demographic categories based on different audience compositions from two or more tagged identifier records (e.g., one or more exposures to one or more television programs and/or one or more product purchases) results in a combined set of likelihoods for the user's demographics. In some examples, the demographics analyzer 310 associates weights with the different demographic information tagged to the user. However, the example demographics analyzer 310 may use other statistical procedures (e.g., principal component analysis) to determine the likelihoods that the user fits into different demographic buckets.

In the illustrated example of FIG. 3, the profile generator 306 includes the example estimator 312 to estimate the demographics for the user based on the results of the analysis performed by the example demographics analyzer 310. For example, the estimator 312 may identify the demographic category (or categories) with the highest likelihood and associate the corresponding demographic category with the user. In general, larger numbers of tagged identifier records (and corresponding demographic information) associated with a given user over time increases the accuracy of the demographics imputations. In the illustrated example of FIG. 3, the profile generator 306 uses the results of the estimator 312 to generate the user profile 128.

In the illustrated example of FIG. 3, the profile generator 306 stores the generated user profile 128 in the example profiles database 314. The profiles database 314 may include a volatile memory (e.g., a Synchronous Dynamic Random Access Memory (SDRAM), Dynamic Random Access Memory (DRAM), RAMBUS Dynamic Random Access Memory (RDRAM, etc.) and/or a non-volatile memory (e.g., flash memory). The profiles database 314 may include one or more double data rate (DDR) memories, such as DDR, DDR2, DDR3, mobile DDR (mDDR), etc. The profiles database 314 may additionally or alternatively include one or more mass storage devices such as hard drive disk(s), compact disk drive(s), digital versatile disk drive(s), etc. While in the illustrated example the profiles database 314 is illustrated as a single database, the profiles database 314 may be implemented by any number and/or type(s) of databases.

The example time stamper 316 of FIG. 3 includes a clock and a calendar. The example time stamper 316 associates a time period (e.g., 1:00 a.m. Central Standard Time (CST) to 1:01 a.m. (CST) and/or a date (e.g., Jan. 1, 2013) with each generated user profile 128 by, for example, appending the period of time and/or the date information to an end of the data in the user profile 128.

In the illustrated example of FIG. 3, the AME server 108 includes the example data storer 318 to store tagged identifier records logged by the example tagged identifier logger 302 and/or user profiles 128 generated by the example profile generator 306.

In the illustrated example, the reporter 320 generates reports based on the generated user profiles. In some examples, the reporter 320 generates reports for a certain user. For example, the reporter 320 may receive a query for a certain user from, for example, the AME 102. In some such examples, the reporter 320 causes the profile generator 306 to generate a report for the specified user. In some examples, the reports are presented to the companies and/or individuals that produce the different assets. The reports may identify different aspects of asset exposure such as which age range(s) and/or genders are more likely to send social media messages when exposed to an asset. For example, the reports may determine whether those who send social media messages about a media event (e.g., a television program) in real-time are the same demographic distribution as the viewers of the media event. Reports may also show that the social media users are young for a first media event but relatively older for a second media event.

While an example manner of implementing the audience measurement entity (AME) server 108 of FIG. 1 is illustrated in FIG. 3, one or more of the elements, processes and/or devices illustrated in FIG. 3 may be combined, divided, re-arranged, omitted, eliminated and/or implemented in any other way. Further, the example tagged identifier logger 302, the example tagged identifiers database 304, the example profile generator 306, the example demographics filterer 308, the example demographics analyzer 310, the example estimator 312, the example profiles database 314, the example time stamper 316, the example data storer 318, the example reporter 320 and/or, more generally, the example AME server 108 of FIG. 1 may be implemented by hardware, software, firmware and/or any combination of hardware, software and/or firmware. Thus, for example, any of the example tagged identifier logger 302, the example tagged identifiers database 304, the example profile generator 306, the example demographics filterer 308, the example demographics analyzer 310, the example estimator 312, the example profiles database 314, the example time stamper 316, the example data storer 318, the example reporter 320 and/or, more generally, the example AME server 108 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example tagged identifier logger 302, the example tagged identifiers database 304, the example profile generator 306, the example demographics filterer 308, the example demographics analyzer 310, the example estimator 312, the example profiles database 314, the example time stamper 316, the example data storer 318 and/or the example reporter 320 is/are hereby expressly defined to include a tangible computer readable storage device or storage disk such as a memory, a digital versatile disk (DVD), a compact disk (CD), a Blu-ray disk, etc. storing the software and/or firmware. Further still, the example AME server 108 of FIG. 1 may include one or more elements, processes and/or devices in addition to, or instead of, those illustrated in FIG. 3, and/or may include more than one of any or all of the illustrated elements, processes and devices.

Figure 4:
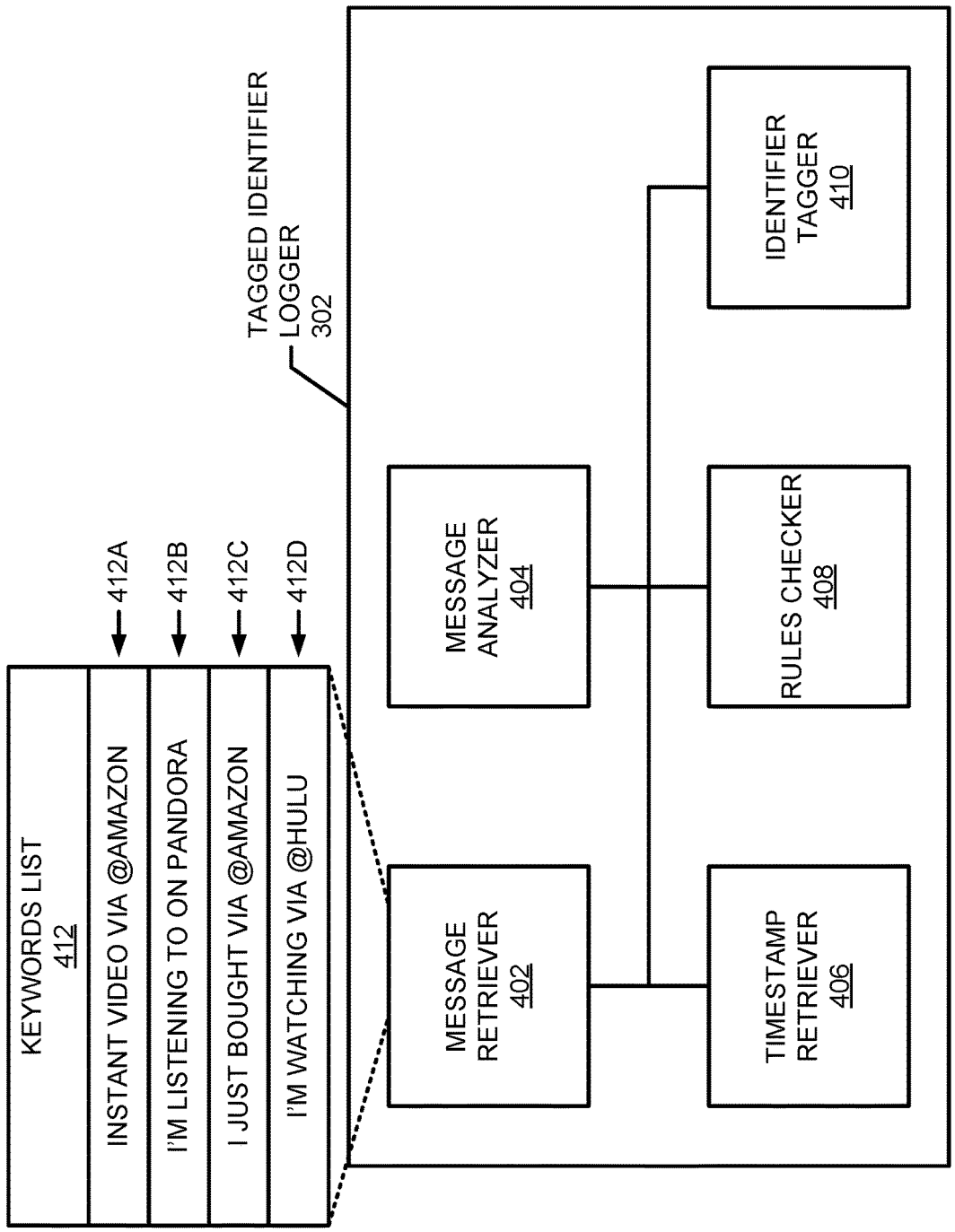
FIG. 4 is a block diagram of an example implementation of the tagged identifier logger of FIG. 3 that may facilitate tagging social media user identifiers with asset demographic information.

FIG. 4 is a block diagram of an example implementation of the tagged identifier logger 302 of FIG. 3 that may facilitate tagging a user identifier associated with a social media message posted by a user regarding an asset of interest with known demographic information associated with the asset. The example tagged identifier logger 302 of the illustrated example includes an example message retriever 402, an example message analyzer 404, an example timestamp retriever 406, an example rules checker 408 and an example identifier tagger 410.

In the illustrated example of FIG. 4, the tagged identifier logger 302 includes the example message retriever 402 to retrieve social media messages (e.g., the example social media messages 114, 115 of FIG. 1) from message hosting servers (e.g., the example message hosting server 104 of FIG. 1). For example, the message retriever 402 may query the message hosting server 104 for a social media message 114 at periodic intervals (e.g., every 24 hours, every Monday, etc.), aperiodic intervals (e.g., when requested), and/or as a one-time event. In the illustrated example of FIG. 4, the message retriever 402 uses an example keywords list 412 including one or more keyword(s) when querying the message hosting server 104. As used herein, the phrase "keyword" includes words and/or phrases that have a dictionary definition and/or correspond to a name and/or correspond to colloquiums that may not have an accepted dictionary definition. Further, although examples disclosed herein are described in connection with a list, many other methods of implementing the keywords list 412 may alternatively be used. For example, disclosed techniques may also be used in connection with a table (e.g., a lookup table), a file, a database, etc.

In the illustrated example, the keywords list 412 includes example keywords 412A, 412B, 412C, 412D. When the example message retriever 402 of the illustrated example queries the message hosting server 104 for social media messages, the message retriever 402 requests only those social media messages 114 that include the keywords in the keywords list 412. In this manner, the example message retriever 402 reduces (e.g., minimizes) the number of social media messages 115 that are returned by the message hosting server 104 that were not posted by a user associated with an asset of interest identifier 120. For example, rather than querying the message hosting server 104 for social media messages 114 that include a television program name (E.R.), which may return social media messages 115 posted by users waiting in an emergency room, the example message retriever 402 of the illustrated example may also include the keywords "I'm watching" as well as a media provider that may enable watching and/or distributes the television program (e.g., @Hulu). In some examples, the message retriever 402 requests one or more social media messages 114 from the message hosting server 104 and then uses the keywords list 412 to filter the social media messages 115 to reduce the set of social media messages 115 to subsequently process. For example, the message retriever 402 may request all social media messages 114 posted to the message hosting server 104 within a time period (e.g., 5:00 p.m. Central Standard Time (CST) to 5:59 p.m. (CST)) and/or a date or date range. The example message retriever 402 may subsequently filter the social media messages 115 using the keywords list 412. In some examples, the message retriever 402 uses one or more keywords when retrieving social media messages. For example, the message retriever 402 may query the message hosting server 104 for social media messages 114 using a first keyword (e.g., an asset identifier 120 such as E.R.) and subsequently filter the returned social media messages 115 using a second keyword (e.g., "I'm watching via @Hulu"). The filtering may be performed using any combination of Boolean operation (e.g., AND, OR, etc.).

While querying the message hosting server 104 using the keywords phrase 412D may reduce the number of returned social media messages 115 to those regarding an asset (e.g., a television program), the television program included in the social media messages 115 may not be regarding a television program of interest. In the illustrated example of FIG. 4, the tagged identifier logger 302 includes the example message analyzer 404 to determine whether the returned social media message 115 includes an asset of interest. For example, the message analyzer 404 may compare the text of the social media message 115 to the asset identifiers 120 listed in the reference database 118. In some examples, if the returned social media message 115 does not include an asset of interest (e.g., the example non-asset regarding message 114b), the message analyzer 404 discards the social media message (e.g., the messages 114b, 115).

In the illustrated example of FIG. 4, the tagged identifier logger 302 includes the example timestamp retriever 406 to obtain a timestamp corresponding to when the returned social media message 115 was posted (e.g., when the message was sent by a user, when the status was updated, etc.). In some examples, the timestamp retriever 406 parses the social media message 115 to identify the message timestamp 116. In some examples, the timestamp retriever 406 may request the corresponding message timestamp from the message hosting server 104. As described in detail below, in some examples, the message timestamp 116 may be used to determine whether the returned social media message 115 was posted contemporaneous and/or near contemporaneous to an asset of interest (e.g., a media event).

In the illustrated example of FIG. 4, the tagged identifier logger 302 includes the example rules checker 408 to ensure only statements indicating an appropriate exposure to an asset are reflected in the social media message statement. The example rules checker 408 functions to increase the probability of the example AME server 108 properly imputing demographics to a social media service user. In some examples, the rules checker 408 functions as a false positive checker. In the illustrated example, the rules checker 408 compares characteristics of the returned social media message 115 to one or more rule(s) 122 associated with the asset identifier 120 identified in the social media message 115. For example, the rules checker 408 may determine whether text of the social media message 115 includes a known vendor or merchant that supplies (e.g., sells) the identified asset (e.g., a product of interest). In some examples, the rule checker 408 compares the message timestamp 116 retrieved by the timestamp retriever 406 to determine whether the message timestamp 116 is sufficiently near the broadcast time(s) of a television program to safely conclude exposure to the television program occurred to thereby link the user via the user identifier 112 to the demographics of the television program audience. In some examples, the rules checker 408 may use a time window based on the broadcast times. For example, the rules checker 408 may perform a time-series analysis of message timestamps to determine a time-lag between real-time broadcast of a television program and when messages related to the television program are posted by users. The example rules checker 408 of the illustrated example uses the time-lag to determine whether the social media message 115 was sent in response to a user viewing the television program (e.g., during or shortly after (e.g., within fifteen minutes of) broadcast of the television program).

In the illustrated example of FIG. 4, the tagged identifier logger 302 includes the example identifier tagger 410 to associate known demographic information of the asset of interest to the user. In some examples, the identifier tagger 410 parses the asset-regarding social media message 114A and identifies the user identifier 112 associated with the message 114A. The example identifier tagger 410 of the illustrated example then tags the user identifier 112 with asset demographic information 124 associated with the asset of interest. For example, the identifier tagger 410 may retrieve the asset demographic information 124 and/or the demographics tag 126 associated with the identified asset identifier 120 from the example reference database 118 and associate the asset demographic information 124 and/or the demographics tag 126 with the user identifier 112. In some examples, the identifier tagger 410 may include additional information along with the tagged identifier such as text included in the asset-regarding social media message 114A and/or an identifier (e.g., a message identifier) to access the message 114A at a subsequent time, which keyword(s) from the keywords list 412 were used by the message retriever 402 to retrieve the asset-regarding social media message 114A, the asset of interest identifier 120 identified by the message analyzer 404, the message timestamp 116 associated with the asset-regarding social media message 114A, etc.

While an example manner of implementing the tagged identifier logger 302 of FIG. 3 is illustrated in FIG. 4, one or more of the elements, processes and/or devices illustrated in FIG. 4 may be combined, divided, re-arranged, omitted, eliminated and/or implemented in any other way. Further, the example message retriever 402, the example message analyzer 404, the example timestamp retriever 406, the example rules checker 408, the example identifier tagger 410 and/or, more generally, the example tagged identifier logger 302 of FIG. 3 may be implemented by hardware, software, firmware and/or any combination of hardware, software and/or firmware. Thus, for example, any of the example message retriever 402, the example message analyzer 404, the example timestamp retriever 406, the example rules checker 408, the example identifier tagger 410 and/or, more generally, the example tagged identifier logger 302 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example message retriever 402, the example message analyzer 404, the example timestamp retriever 406, the example rules checker 408 and/or the example identifier tagger 410 is/are hereby expressly defined to include a tangible computer readable storage device or storage disk such as a memory, a digital versatile disk (DVD), a compact disk (CD), a Blu-ray disk, etc. storing the software and/or firmware. Further still, the example tagged identifier logger 302 of FIG. 3 may include one or more elements, processes and/or devices in addition to, or instead of, those illustrated in FIG. 4, and/or may include more than one of any or all of the illustrated elements, processes and devices.

FIG. 5 illustrates an example data table 500 storing data representing tagged identifiers that may be collected by the example AME server 108 of FIGS. 1, 3 and/or 4. In the illustrated example of FIG. 5, the data table 500 identifies a user identifier 112, a demographics tag 126, a message identifier 502, message keywords information 504, an asset identifier 120 and a message timestamp 116. In the illustrated example, the AME server 108 extracts the user identifier 112 from the asset-regarding social media message 114A when the message 114A corresponds to an asset of interest (e.g., includes a reference to the asset identifier 120). For example, in row 514, the user identifier 112 indicates that a user associated with the user identifier 112 (@user3) posted the corresponding asset-regarding social media message 114A. Further, the AME server 108 identifies demographic information associated with the asset identifier 120 (necklace) and tags the user identifier 112 (@user3) with the corresponding demographics tag 126 (Tag C). In the illustrated example, the AME server 108 also stores additional information from the asset-regarding social media message 114A in the tagged identifier record. For example, in row 510, the tagged identifier logger 302 associates the asset-regarding social media message 114A with a message identifier 502 (101101), stores the keyword(s) 504 ("I just bought via @amazon") used by the message retriever 402 when retrieving the asset-regarding social media message 114A, stores the asset identifier 120 (Twilight (book)) in the asset-regarding social media message 114A, and the message timestamp 116 retrieved by the timestamp retriever 406 (11/10/2013 at 9:45:05 a.m.) indicating when the asset-regarding social media message 114A was posted by the user.

FIG. 6 illustrates an example data table 600 storing data representing estimated demographics of social media user identifiers that may be collected by the example AME server 108 of FIGS. 1, 3 and/or 4. In the illustrated example of FIG. 6, the data table 600 identifies a user identifier 112 and asset demographic information 124 tagged to the user identifier 112. In the illustrated example, the AME server 108 extracts the tagged identifier information from the tagged identifiers database 304. For example, the profile generator 306 may parse the tagged identifiers stored in the tagged identifiers database 304 and combine the records that correspond to the same user identifier 112. For example, in row 604, the asset demographic information 124 associated with the user identifier 112 (@user2) indicates that the user associated with the user identifier 112 (@user2) posted three asset-regarding social media messages 114A that were logged by the tagged identifier logger 302. Further, the data table 600 includes the results of the demographic analysis performed by the AME server 108 (e.g., demographics analysis results 610). For example, the demographics analyzer 310 may apply statistical methods such as Bayesian analysis to the different demographic segments associated with different asset-regarding social media messages 114A for which the same user is known to have sent the different messages 114A as determined by, for example, the user identifier 112 associated with the different asset-regarding social media messages 114A. In the illustrated example, the data table 600 includes estimated user demographic information 612 based on the corresponding demographics analysis results 610. In the illustrated example, the AME server 108 may identify the demographic segment with the highest likelihood as the demographics for the user (e.g., the estimated user demographic information 612). In some examples, when estimating the user demographic information 612, the percentages of the demographic analysis results 610 may be modified based on known social media usage patterns (e.g., if females less than age 20 are more likely to use social media than males less than age 20, the percentages of the demographic analysis results 610 may be weighted or otherwise adjusted to reflect those likelihoods).

Figure 7:
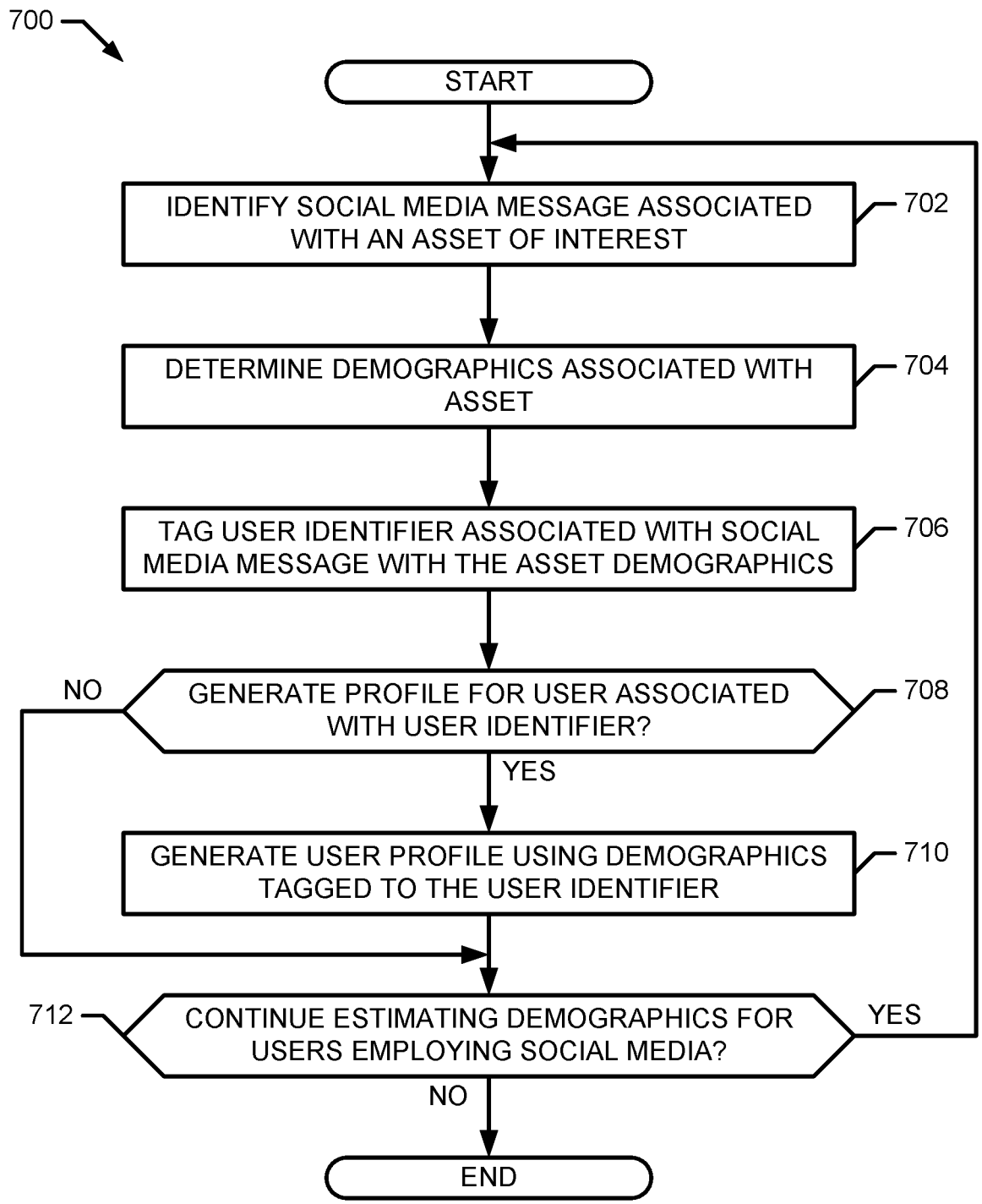
FIG. 7 is a flowchart representative of example machine-readable instructions that may be executed to estimate demographics of users employing social media.
Figure 8:
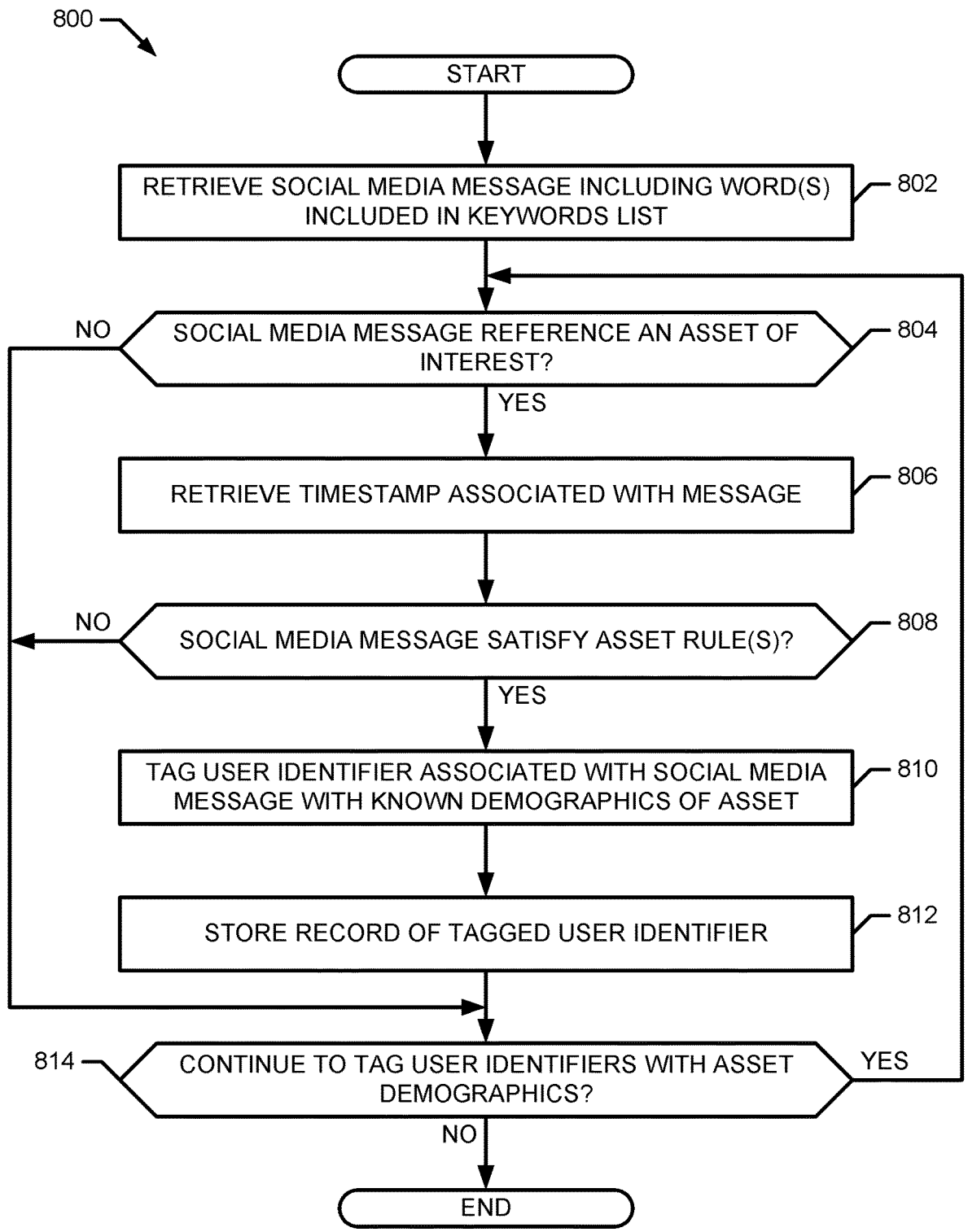
FIG. 8 is a flowchart representative of example machine-readable instructions that may be executed to tag user identifiers of social media messages with demographics of assets of interest.
Figure 9:
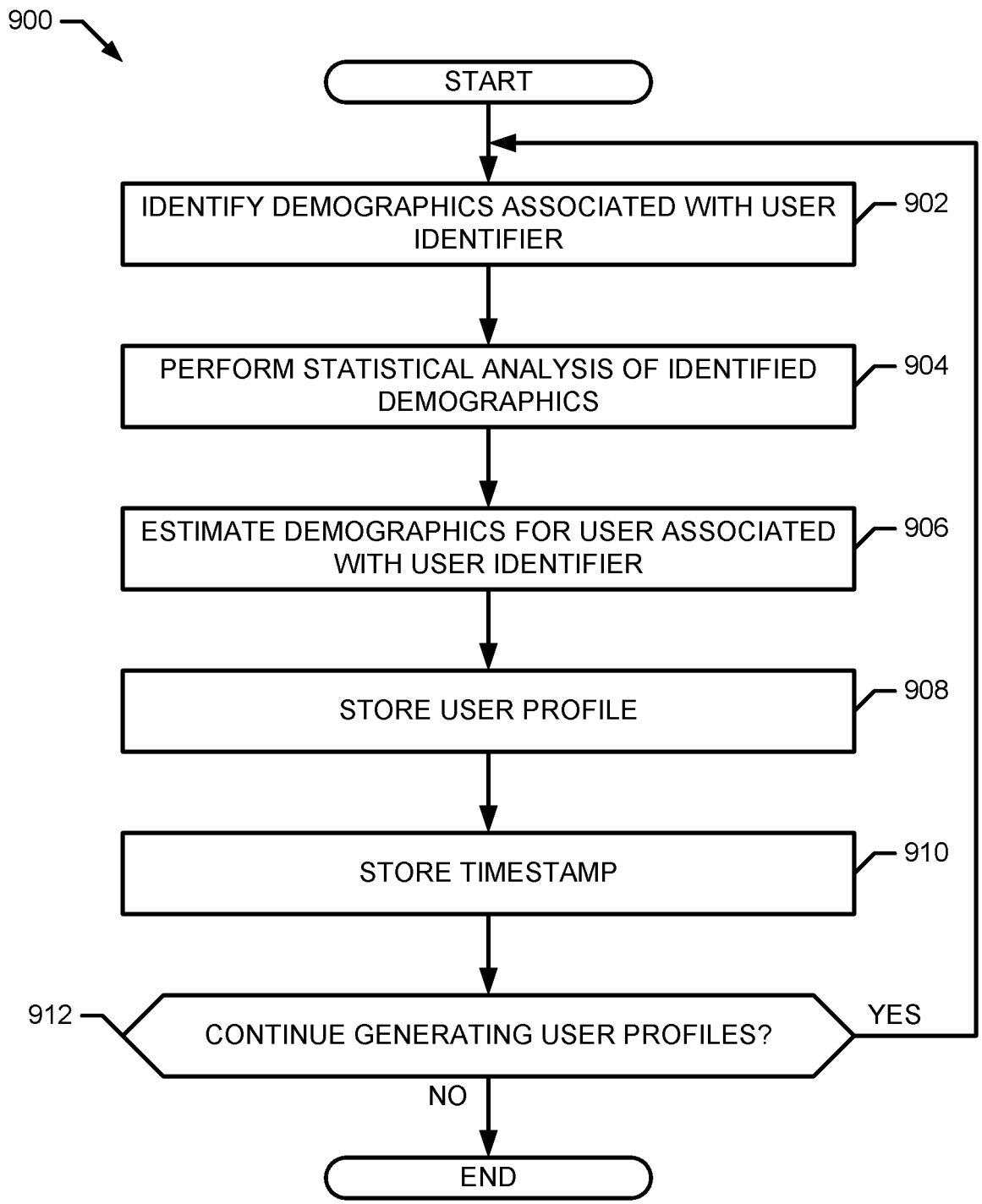
FIG. 9 is a flowchart representative of example machine-readable instructions that may be executed to generate profiles estimating demographics of users employing social media.

Flowcharts representative of example machine readable instructions for implementing the AME server 108 of FIGS. 1, 3 and/or 4 are shown in FIGS. 7-9. In this example, the machine readable instructions comprise a program for execution by a processor such as the processor 1012 shown in the example processor platform 1000 discussed below in connection with FIG. 10. The program may be embodied in software stored on a tangible computer readable storage medium such as a CD-ROM, a floppy disk, a hard drive, a digital versatile disk (DVD), a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowcharts illustrated in FIGS. 7-9, many other methods of implementing the example AME server 108 of FIGS. 1, 3 and/or 4 may alternatively be used. For example, the order of execution of the blocks may be changed, and/or some of the blocks described may be changed, eliminated, or combined.

As mentioned above, the example processes of FIGS. 7-9 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 7-9 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The example program 700 of FIG. 7 estimates demographics of users employing social media at the example AME server 108 (FIGS. 1, 3 and/or 4). The example program 700 of FIG. 7 begins at block 702 when the AME server 108 identifies an asset-regarding social media message 114A. For example, the tagged identifier logger 302 (FIGS. 3 and/or 4) may retrieve the returned social media message 115 from the message hosting server 104 (FIG. 1) and analyze the text of the social media message 115 to determine whether a user posted the social media message 115 regarding an asset of interest (e.g., identified via a reference to an asset identifier 120) included in the reference database 118 (FIG. 1).

At block 704, the AME server 108 determines asset demographic information associated with the asset of interest. For example, the tagged identifier logger 302 may retrieve asset demographic information 124 from the data table 200 stored in the reference database 118. At block 706, the AME server 108 tags (e.g., associates) a user identifier associated with the asset-regarding social media message 114A with the determined asset demographic information 124. For example, the tagged identifier logger 302 may identify the user identifier 112 associated with the asset-regarding social media message 114A and tag the user identifier 112 with the asset demographic information 124. In some examples, the tagged identifier logger 302 records the tagged identifier in the tagged identifiers database 304 (FIG. 3).

At block 708, the AME server 108 determines whether to generate a profile of a user associated with the user identifier 112. For example, the reporter 320 (FIG. 3) may query the profile generator 306 for a profile for a certain user. If, at block 708, the profile generator 306 determines to generate a user profile, then, at block 710, the profile generator 306 generates a user profile using demographic information tagged to the user identifier 112 associated with the user. For example, the profile generator 306 may identify one or more tagged identifiers that are associated with a user from the tagged identifiers database 304 and perform statistical analysis on the asset demographic information 124 tagged to the user identifier 112. In some examples, the profile generator 306 stores the generated user profile 128 in the profiles database 314 (FIG. 3).

If, at block 708, the profile generator 306 determines not to generate the user profile 128 or after the profile generator 306 generates the user profile 128 at block 710, control proceeds to block 712 at which the AME server 108 determines whether to continue estimating demographics of users employing social media. If, at block 712, the AME server 108 determines to continue estimating demographics of users employing social media (e.g., the tagged identifier logger 302 is continuing to retrieve social media messages 115 from the message hosting server 104, the profile generator 306 is continuing to receive requests for user profiles 128, etc.), control returns to block 702 to identify another social media message associated with an asset (e.g., the asset-regarding social media message 114A). Otherwise, if, at block 712, the AME server 108 determines to end estimating demographics of users employing social media (e.g., due to a server shutdown event, etc.), the example process 700 of FIG. 7 then ends.

The example program 800 of FIG. 8 tags a user identifier associated with asset-regarding social media messages with demographic information associated with the same asset of interest at the AME server 108 of FIGS. 1, 3 and/or 4. The example program of FIG. 8 may be used to implement blocks 702, 704 and 706 of FIG. 7. The example program 800 of FIG. 8 begins at block 802 at which the tagged identifier logger 302 (FIGS. 3 and/or 4) retrieves a social media message including one or more word(s) included in a keywords list. For example, the message retriever 402 may receive the social media message 115 in response to a query to the message hosting server 104 for social media messages 114 that include the one or more word(s) included in the keywords list 412.

At block 804, the tagged identifier logger 302 determines whether the returned social media message 115 references an asset of interest. For example, the message analyzer 404 may compare the text of the social media message 115 to asset identifiers 120 included in the data table 200. If, at block 804, the message analyzer 404 identifies a reference that matches (e.g., is the same or nearly the same as) an asset identifier 120, then, at block 806, the tagged identifier logger 302 retrieves the timestamp 116 associated with when the social media message 115 was posted (e.g., sent or conveyed by the message sender). For example, the timestamp retriever 406 may retrieve the message timestamp 116 from the text of the social media message 115. In some examples, the timestamp retriever 406 may request the message timestamp 116 from the media hosting server 104.

At block 808, the tagged identifier logger 302 determines whether characteristics of the social media message 115 satisfy one or more rule(s) (e.g., specific criteria) associated with the identified asset of interest. For example, the rules checker 408 may determine whether the message timestamp 116 is sufficiently near the broadcast time(s) of a television program to safely conclude exposure to the television program occurred by the user. In some examples, the rules checker 408 may determine whether the text of the social media message 115 includes a known vendor that supplies (e.g., distributes, sells and/or provides) the asset of interest. In some examples, the rules checker 408 may perform a time-series analysis of message timestamps 116 to determine a time-lag between real-time broadcast of a television program and when social media messages related to the television program are sent by users. The example rules checker 408 may use the time-lag to determine whether the social media message is sent by the user in response to the user viewing the television show (e.g., during or shortly after (e.g., within fifteen minutes of) broadcast of the television show).

If, at block 808, the rules checker 408 determines that the social media message 115 satisfies the one or more rule(s) associated with the identified asset of interest (e.g., the social media message 115 is an asset-regarding social media message 114A), then, at block 810, the tagged identifier logger 302 tags the user identifier associated with the asset-regarding social media message 114A with asset demographic information associated with the asset of interest. For example, the identifier tagger 410 parses the asset-regarding social media message 114A to identify the user identifier 112. The identifier tagger 410 may also retrieve asset demographic information 124 from the data table 200 based on the asset identifier 120 identified in the asset-regarding social media message 114A and tag (e.g., associate) the asset demographic information 124 to the user identifier 112. At block 812, the tagged identifier logger 302 stores a record of the tagged identifier in the tagged identifiers database 304.

If, at block 804, the message analyzer 404 determines that the social media message 115 does not include a reference to an asset of interest (e.g., the social media message 115 does not include a reference to an asset identifier 120 included the data table 200 and, thereby, is a non-asset regarding social media message 114B), or, if at block 808, the rules checker 408 determines that the social media message 115 does not satisfy the one or more rule(s) associated with the asset of interest (e.g., the social media message 115 is a non-asset regarding social media message 114B), or after the tagged identifier logger 302 stores a record of the tagged identifier in the tagged identifiers database 304 at block 812, control proceeds to block 814 at which the tagged identifier logger 302 determines whether to continue to tag user identifiers with demographic information associated with identified assets of interest. If, at block 814, the tagged identifier logger 302 determines to continue tagging user identifiers with demographic information associated with identified assets of interest (e.g., the tagged identifier logger 302 is continuing to retrieve social media messages 115 from the message hosting server 104), control returns to block 804 to determine whether the returned social media message 115 references an asset of interest. Otherwise, if, at block 814, the tagged identifier logger 302 determines to end tagging user identifiers with demographic information associated with identified assets of interest (e.g., there are not additional social media messages to process, due to a server shutdown event, etc.), the example process 800 of FIG. 8 then ends.

The example program 900 of FIG. 9 generates a user profile estimating demographics of a user employing social media at the example AME server 108 (FIGS. 1, 3 and/or 4). The example program 900 of FIG. 9 may be used to implement block 710 of FIG. 7. The example program 900 of FIG. 9 begins at block 902 when the AME server 108 identifies demographic information associated with a user identifier. For example, the demographics filterer 308 (FIG. 3) may parse the tagged identifier records stored in the tagged identifiers database 304 for the asset demographic information 124 tagged (e.g., associated) with the user identifier 112. In some examples, the demographics filterer 308 combines the asset demographic information 124 tagged with two or more user identifiers 112 that are associated with the same user.

At block 904, the AME server 108 performs statistical analysis of the identified asset demographic information 124. For example, the demographics analyzer 310 (FIG. 3) may apply statistical methods such as Bayesian analysis to the asset demographic information 124 to determine the likelihood that the user fits into different demographic segments (e.g., the demographics analysis results 610 included in the data table 600). At block 906, the AME server 108 estimates the demographics for the user associated with the user identifier 112. For example, the estimator 312 (FIG. 3) may identify the demographic category (or categories) with the highest likelihood and associate the corresponding demographic category with the user (e.g., the estimated user demographic information 612 included in the data table 600). In general, larger numbers of tagged identifier records (and corresponding demographic information) associated with a given user over time increases the accuracy of the demographics imputations (e.g., the estimated user demographics).

At block 908, the AME server 108 stores a user profile for the user including the estimated user demographics for the user. For example, the profile generator 306 (FIG. 3) may generate the user profile 128 for the user using the estimated user demographic information 612 and store the generated user profile 128 in the profiles database 314 (FIG. 3). At block 910, the AME server 108 stores a timestamp with the estimated user demographic information 612. For example, the time stamper 316 (FIG. 3) may associate a time period (e.g., 1:00 a.m. Central Standard Time (CST) to 1:01 a.m. (CST) and/or a date (e.g., Jan. 1, 2013) with each generated user profile 128 by, for example, appending the period of time and/or the date information to an end of the data in the user profile 128.

At block 912, the AME server 108 determines whether to continue generating user profiles. If, at block 912, the AME server 108 determines to continue generating user profiles (e.g., the profile generator 306 is continuing to receive requests for user profiles 128, etc.), control returns to block 902 to identify demographic information associated with another user. Otherwise, if, at block 912, the AME server 108 determines to end generating user profiles (e.g., there are not additional requests to generate user profiles, due to a server shutdown event, etc.), the example process 900 of FIG. 9 then ends.

Figure 10:
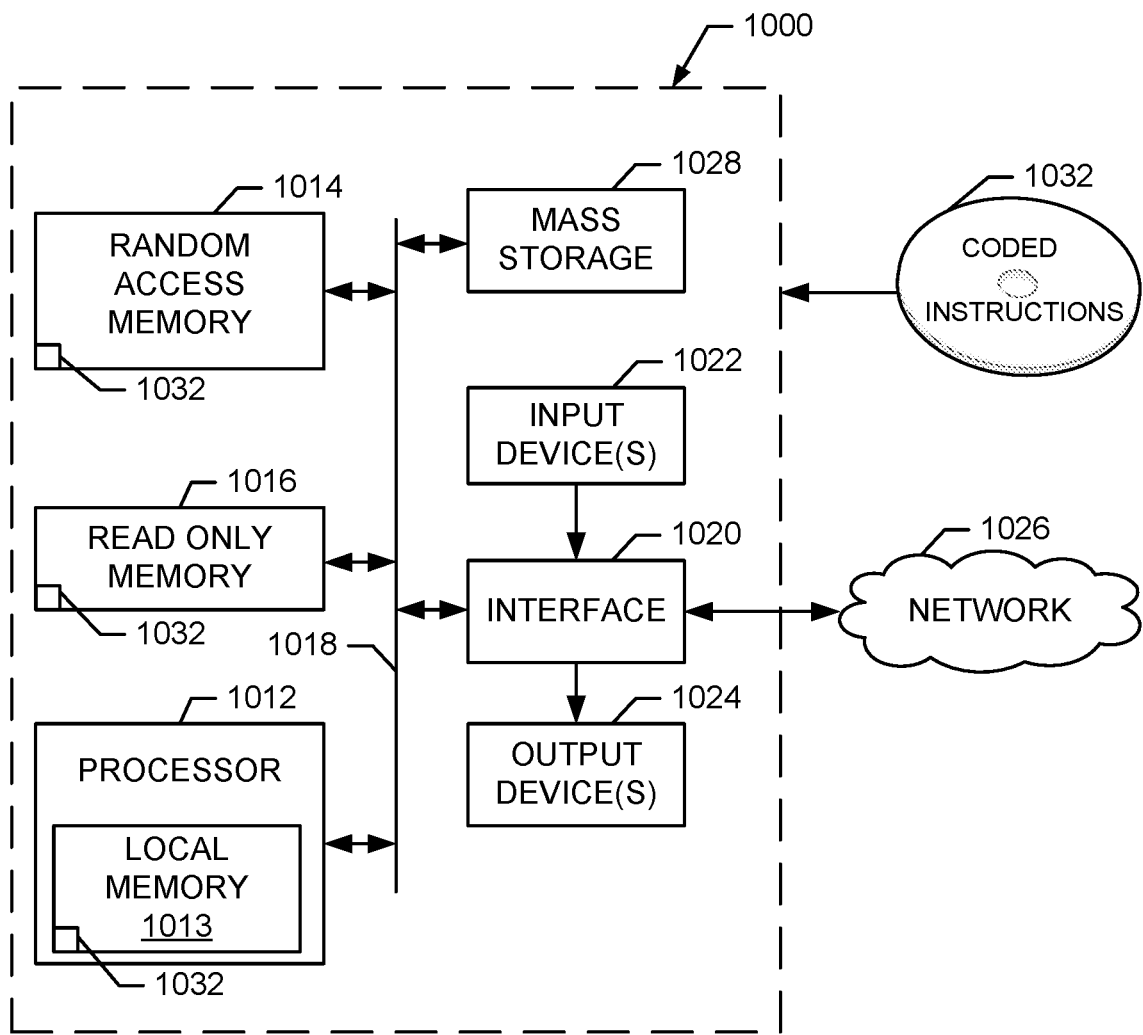
FIG. 10 is a block diagram of an example processing platform capable of executing the example machine-readable instructions of FIGS. 7-9 to implement the example audience measurement entity server of FIGS. 1, 3 and/or 4.

FIG. 10 is a block diagram of an example processor platform 1000 capable of executing the instructions of FIGS. 7-9 to implement the example AME server 108 of FIGS. 1, 3 and/or 4. The processor platform 1000 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), and/or a PCI express interface.

In the illustrated example, one or more input devices 1022 are connected to the interface circuit 1020. The input device(s) 1022 permit(s) a user to enter data and commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1020 of the illustrated example, thus, typically includes a graphics driver card, a graphics driver chip or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.).

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, RAID systems, and digital versatile disk (DVD) drives.

The coded instructions 1032 of FIGS. 7-9 may be stored in the mass storage device 1028, in the volatile memory 1014, in the non-volatile memory 1016, and/or on a removable tangible computer readable storage medium such as a CD or DVD.

From the foregoing, it will be appreciated that methods, apparatus and articles of manufacture have been disclosed which enable imputing demographic information of a known first group of people onto an unknown second group of people, and, thereby, enabling tracking the reach and effectiveness of an asset based on the reported exposure to the asset by the second group of people. Such imputations may be based on (1) posts made via social media sites by the second group of people and (2) demographics and media exposure data collected for the first group of people. The first group of people may be panelists of an audience and/or market research study.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to estimate demographics of a user of social media, the method comprising:
   identifying, by executing an instruction with a processor, first demographics of a first subset of a panel that is associated with a first media asset and second demographics of a second subset of the panel that is associated with a second media asset;
   transmitting, by executing an instruction with the processor, an electronic query to a message hosting server via a computer network, the electronic query including a keyword list including a first asset identifier corresponding to the first media asset and a second asset identifier corresponding to the second media asset to obtain a plurality of social media messages that are transmitted over a computer network;
   detecting, by executing an instruction with the processor, a first social media message of the plurality of social media messages that mentions the first media asset, the first social media message originated by or received by a user and a second social media message of the plurality of social media messages that mentions the second media asset, the second social media message originated by or received by the user;
   determining, by executing an instruction with the processor, the first social media message satisfies a first media asset rule, the first media asset rule corresponding to a first time block associated with the first media asset;
   in response to the determining, generating, by executing an instruction with the processor, a composite demographic profile for the user based on the first demographics and the second demographics; and
   storing an association of the composite demographic profile with the user.

2. The method of claim 1, wherein a first user identifier associated with the first social media message is tagged with the first demographics and a second user identifier associated with the second social media message is tagged with the second demographics.

3. The method of claim 2, wherein the first demographics include a first set of demographic categories, each demographic category including a likelihood of representing the first demographics and the second demographics include a second set of demographic categories, each demographic category including a likelihood of representing the second demographics.

4. The method of claim 3, wherein the composite demographic profile is generated based on a statistical analysis of the likelihoods for each demographic category from the first demographics and the second demographics.

5. The method of claim 2, wherein storing an association of the composite demographic profile includes storing a record of the first user identifier tagged with the first demographics and a record of the second user identifier tagged with the second demographics.

6. The method of claim 1, wherein the first media asset and the second media asset are associated with at least one keyword.

7. The method of claim 1, further including determining, by executing an instruction with the processor, the second social media message satisfies a second media asset rule, the second media asset rule corresponding to a second time block associated with the second media asset.

8. A system to estimate demographics of a user of social media, the system comprising:
   an identifier to identify, by executing an instruction with a processor, first demographics of a first subset of a panel that is associated with a first media asset and second demographics of a second subset of the panel that is associated with a second media asset;
   a transmitter to transmit, by executing an instruction with the processor, an electronic query to a message hosting server via a computer network, the electronic query including a keyword list including a first asset identifier corresponding to the first media asset and a second asset identifier corresponding to the second media asset to obtain a plurality of social media messages that are transmitted over a computer network;
   a detector to detect, by executing an instruction with the processor, a first social media message of the plurality of social media messages that mentions the first media asset, the first social media message originated by or received by a user and a second social media message of the plurality of social media messages that mentions the second media asset, the second social media message originated by or received by the user;
   the identifier to determine the first social media message satisfies a first media asset rule, the first media asset rule corresponding to a first time block associated with the first media asset;
   a generator to generate, in response to the determining, by executing an instruction with the processor, a composite demographic profile for the user based on the first demographics and the second demographics; and
   an association storer to, by executing an instruction with the processor, store an association of the composite demographic profile with the user.

9. The system of claim 8, wherein a first user identifier associated with the first social media message is tagged with the first demographics and a second user identifier associated with the second social media message is tagged with the second demographics.

10. The system of claim 9, wherein the first demographics include a first set of demographic categories, each demographic category including a likelihood of representing the first demographics and the second demographics include a second set of demographic categories, each demographic category including a likelihood of representing the second demographics.

11. The system of claim 10, wherein the composite demographic profile is generated based on a statistical analysis of the likelihoods for each demographic category from the first demographics and the second demographics.

12. The system of claim 9, wherein storing an association of the composite demographic profile includes storing a record of the first user identifier tagged with the first demographics and a record of the second user identifier tagged with the second demographics.

13. The system of claim 8, wherein the first media asset and the second media asset are associated with at least one keyword.

14. The system of claim 8, further including the identifier to determine the second social media message satisfies a second media asset rule, the second media asset rule corresponding to a second time block associated with the second media asset.

15. A tangible computer-readable storage medium comprising instructions that, when executed, cause a processor to at least:
   identify, by executing an instruction with a processor, first demographics of a first subset of a panel that is associated with a first media asset and second demographics of a second subset of the panel that is associated with a second media asset;
   transmit, by executing an instruction with the processor, an electronic query to a message hosting server via a computer network, the electronic query including a keyword list including a first asset identifier corresponding to the first media asset and a second asset identifier corresponding to the second media asset to obtain a plurality of social media messages that are transmitted over a computer network;
   detect, by executing an instruction with the processor, a first social media message of the plurality of social media messages that mentions the first media asset, the first social media message originated by or received by a user and a second social media message of the plurality of social media messages that mentions the second media asset, the second social media message originated by or received by the user;
   determine the first social media message satisfies a first media asset rule, the first media asset rule corresponding to a first time block associated with the first media asset;
   in response to the determining, generate a composite demographic profile for the user based on the first demographics and the second demographics; and
   store an association of the composite demographic profile with the user.

16. The tangible computer-readable storage medium of claim 15, wherein a first user identifier associated with the first social media message is tagged with the first demographics and a second user identifier associated with the second social media message is tagged with the second demographics.

17. The tangible computer-readable storage medium of claim 16, wherein the first demographics include a first set of demographic categories, each demographic category including a likelihood of representing the first demographics and the second demographics include a second set of demographic categories, each demographic category including a likelihood of representing the second demographics.

18. The tangible computer-readable storage medium of claim 17, wherein the composite demographic profile is generated based on a statistical analysis of the likelihoods for each demographic category from the first demographics and the second demographics.

19. The tangible computer-readable storage medium of claim 16, wherein storing an association of the composite demographic profile includes storing a record of the first user identifier tagged with the first demographics and a record of the second user identifier tagged with the second demographics.

20. The tangible computer-readable storage medium of claim 15, wherein the first media asset and the second media asset are associated with at least one keyword.

* * * * *